(12) United States Patent
Yamada

(10) Patent No.: US 8,319,864 B2
(45) Date of Patent: Nov. 27, 2012

(54) IMAGING APPARATUS AND IMAGING METHOD

(75) Inventor: Manabu Yamada, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 426 days.

(21) Appl. No.: 12/717,523

(22) Filed: Mar. 4, 2010

(65) Prior Publication Data

US 2011/0007182 A1 Jan. 13, 2011

(30) Foreign Application Priority Data

Jul. 10, 2009 (JP) ................................ 2009-163900

(51) Int. Cl.
*H04N 5/202* (2006.01)

(52) U.S. Cl. ...................... 348/254; 348/221.1; 348/246

(58) Field of Classification Search ............... 348/221.1, 348/246, 254
See application file for complete search history.

(56) References Cited

U.S. PATENT DOCUMENTS

| | | | | |
|---|---|---|---|---|
| 2001/0007599 | A1* | 7/2001 | Iguchi et al. | 382/274 |
| 2004/0041927 | A1* | 3/2004 | Cho et al. | 348/254 |
| 2004/0169125 | A1 | 9/2004 | Yamada | |
| 2006/0044425 | A1* | 3/2006 | Yeung et al. | 348/246 |
| 2006/0250515 | A1 | 11/2006 | Koseki et al. | |
| 2008/0225136 | A1 | 9/2008 | Yamada | |
| 2009/0073282 | A1 | 3/2009 | Yamada et al. | |

FOREIGN PATENT DOCUMENTS

| | | |
|---|---|---|
| JP | 4129338 | 4/1992 |
| JP | 4264251 | 9/1992 |
| JP | 10-262182 | 9/1998 |
| JP | 2000-92378 | 3/2000 |
| JP | 2000-228747 | 8/2000 |
| JP | 2002-92607 | 3/2002 |
| JP | 2002-281361 | 9/2002 |
| JP | 2006-109327 | 4/2006 |
| JP | 2006-180270 | 7/2006 |

* cited by examiner

*Primary Examiner* — Anthony J Daniels
(74) *Attorney, Agent, or Firm* — Dickstein Shapiro LLP

(57) ABSTRACT

An imaging apparatus includes: an image sensor; a pixel output judging processor which judges if a pixel output reaches a saturation level or not; a pixel output compensation processor which performs a compensating operation to compensate a pixel output of a pixel of a specific color which reaches the saturation level; a bit compression convertor which performs a bit compression such that pixel output data, which is once converted from a first bit number to a second bit number, is converted again to the first bit number; a histogram producer which produces a brightness histogram of a photographic subject image; and a calculator which calculates a ratio of the number of pixels of a maximum brightness area to the number of entire pixels from the brightness histogram, wherein the bit compression convertor performs the bit compression based on a bit compression characteristic set on the basis of the ratio of the number of pixels of the maximum brightness area.

20 Claims, 15 Drawing Sheets

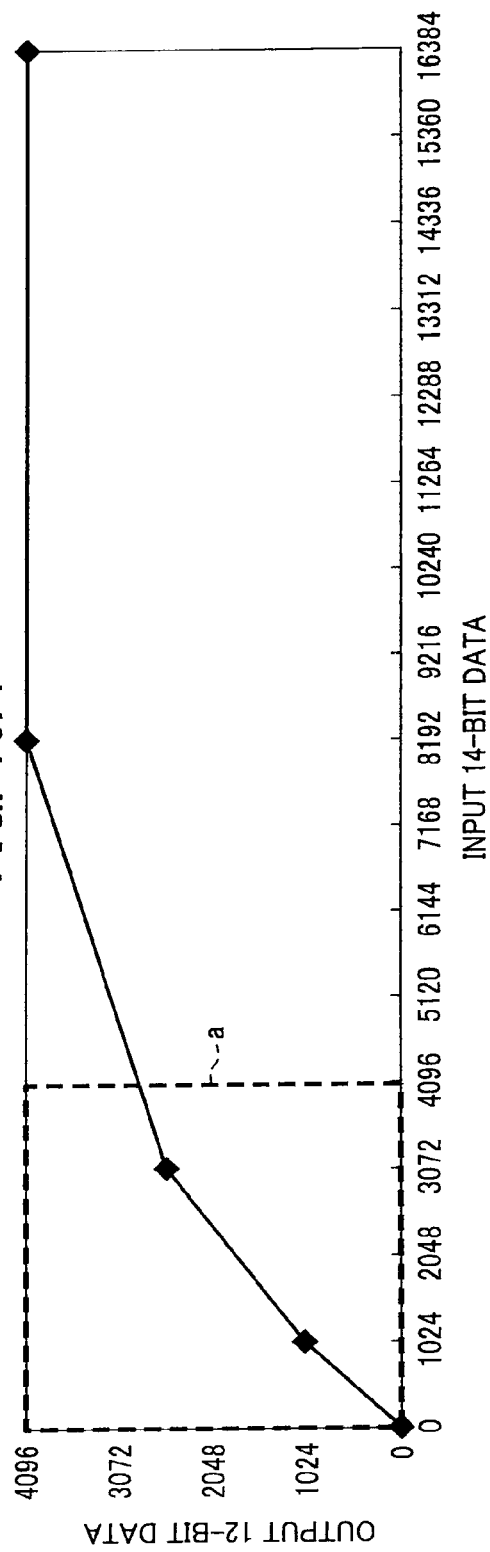
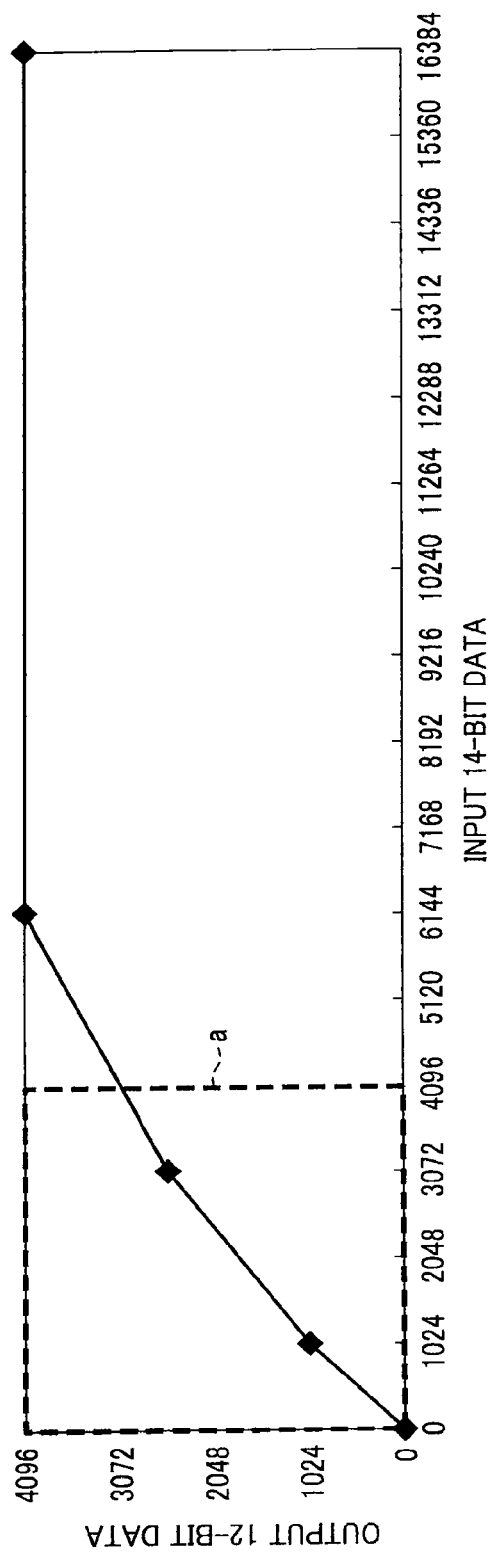

FIG. 18

| | | A | | | | |
|---|---|---|---|---|---|---|
| R | G | R | G | R | G | · · · · · |
| G | B | G | B | G | B | · · · · · |
| R | G | R1 | G | R | G | · · · · · |
| G | B1 | G | B2 | G | B | · · · · · |
| R | G | R2 | G | R | G | · · · · · |
| G | B | G | B | G | B | · · · · · |
| R | G | R | G | R | G | · · · · · |
| G | B | G | B | G | B | · · · · · |
| · | · | · | · | · | · | |
| · | · | · | · | · | · | |

IMAGING APPARATUS AND IMAGING METHOD

CROSS REFERENCE TO RELATED APPLICATIONS

The present invention is based on Japanese Patent Application Numbers 2008-232862, filed Sep. 11, 2008, and 2009-163900, filed Jul. 10, 2009, the disclosures of which are hereby incorporated by reference herein in their entireties.

BACKGROUND

The present invention relates to an imaging apparatus such as a digital still camera and a digital video camera, and to an imaging method. In particular, the present invention relates to an imaging apparatus which is capable of expanding a dynamic range of a shooting image, and an imaging method thereof.

A dynamic range of an image shot by a digital still camera, a digital video camera, and the like having a solid-state image sensor such as a CCD is far narrower than a dynamic range of an image shot by a traditional silver-halide camera using silver-halide photography film. In a case where the dynamic range is narrow, "blackout" occurs in a dark area of a photographic subject and "whiteout" occurs in a bright area of the photographic subject, and thereby image quality becomes lower.

In order to expand the dynamic range of the image imaged by the solid-state image sensor such as the CCD, for example, Japanese patent application publication No. 2000-92378 discloses a technique in which a plurality of shootings is performed with different exposure amounts on the same photographic subject, a plurality of different exposure-amount images is obtained, and then these images are combined together to produce a composite image with an expanded dynamic range.

However, in a case where a photographic subject is a moving object and is shot by a method of expanding the dynamic range as disclosed in Japanese patent application publication No. 2000-92378 above, double-images are often obtained and thereby a composite image with an expanded dynamic range is not produced successfully.

SUMMARY

An object of the present invention is to provide an imaging apparatus which is capable of expanding a dynamic range at one shooting, without performing a plurality of shootings with different exposure amounts, and producing a composite image with an expanded dynamic range, and to provide an imaging method thereof.

To achieve the object of the present invention, an embodiment of the present invention provides: an imaging apparatus, comprising: an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of each of the pixels and images an image of the photographic subject; a pixel output judging processor which judges if the pixel output of each of the pixels converted to data reaches a saturation level or not; a pixel output compensation processor, in a case where a pixel output of a pixel on which a specific color filter is placed is judged to reach the saturation level by the pixel output judging processor, based on a pixel output of a pixel on which a color filter other than the specific color filter is placed in the vicinity of the pixel on which the specific color filter is placed, which performs a compensating operation to compensate the pixel output of the pixel on which the specific color filter is placed which reaches the saturation level; a bit compression convertor which performs a bit compression such that pixel output data from the pixel output compensation processor, which is once converted from a first bit number to a second bit number larger than the first bit number, is converted again to the first bit number; a histogram producer which produces a brightness histogram of the image of the photographic subject based on the pixel output of each of the pixels; and a calculator which calculates a ratio of the number of pixels of a maximum brightness area of areas where a brightness distribution is plurally divided to the number of entire pixels from the brightness histogram produced by the histogram producer, wherein the bit compression convertor performs the bit compression based on a bit compression characteristic set on the basis of the ratio of the number of pixels of the maximum brightness area calculated by the calculator.

To achieve the object of the present invention, an embodiment of the present invention provides: an imaging method of an imaging apparatus including an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of each of the pixels and images an image of the photographic subject, comprising: a pixel output judging processing step which judges if the pixel output of each of the pixels converted to data reaches a saturation level or not; a pixel output compensation processing step, in a case where a pixel output of a pixel on which a specific color filter is placed is judged to reach the saturation level by the pixel output judging processing step, based on a pixel output of a pixel on which a color filter other than the specific color filter is placed in the vicinity of the pixel on which the specific color filter is placed, which performs a compensating operation to compensate the pixel output of the pixel on which the specific color filter is placed which reaches the saturation level; a bit compression converting step which performs a bit compression such that pixel output data from the pixel output compensation processing step, which is once converted from a first bit number to a second bit number larger than the first bit number, is converted again to the first bit number; a histogram producing step which produces a brightness histogram of the image of the photographic subject based on the pixel output of each of the pixels; and a calculating step which calculates a ratio of the number of pixels of a maximum brightness area of areas where a brightness distribution is plurally divided to the number of entire pixels from the brightness histogram produced by the histogram producing step, wherein the bit compression converting step performs the bit compression based on a bit compression characteristic set on the basis of the ratio of the number of pixels of the maximum brightness area calculated by the calculating step.

BRIEF DESCRIPTION OF THE DRAWINGS

FIG. 10A illustrates a conversion graph which is used when performing a bit compression to convert the pixel output data extended (converted) to 14-bit data to 12-bit data.

FIG. 10B illustrates a conversion graph which is used when performing the bit compression to convert the pixel output data extended (converted) to 14-bit data to 12-bit data.

FIG. 18 illustrates an arrangement position of the RGB filter and a processing unit in Embodiment 6 of the present invention.

DETAILED DESCRIPTION OF THE PREFERRED EMBODIMENTS

Hereinafter, with reference to the drawings, embodiments of the present invention will be explained.

Embodiment 1

Figure 1A:
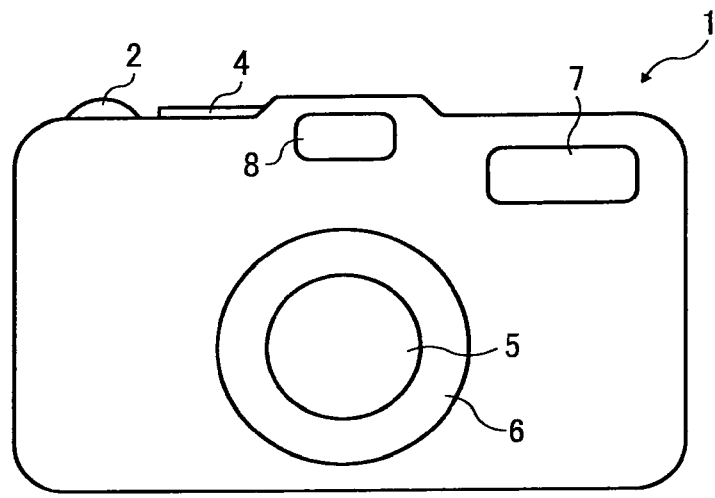
FIG. 1A is a front view of a digital camera as an example of an imaging apparatus according to Embodiment 1 of the present invention.
Figure 1B:
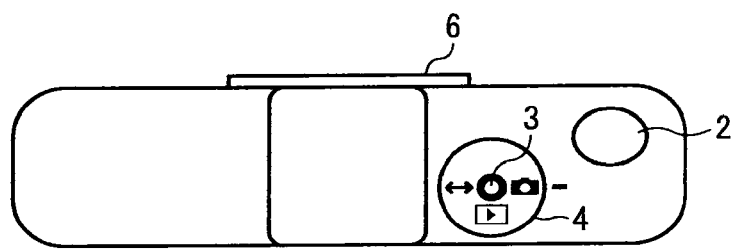
FIG. 1B is a top view of the digital camera as an example of the imaging apparatus according to Embodiment 1 of the present invention.
Figure 1C:
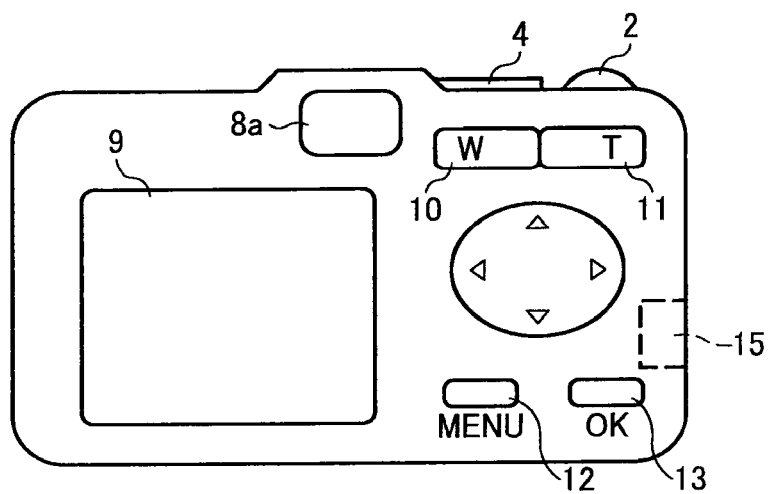
FIG. 1C is a back view of the digital camera as an example of the imaging apparatus according to Embodiment 1 of the present invention.
Figure 2:
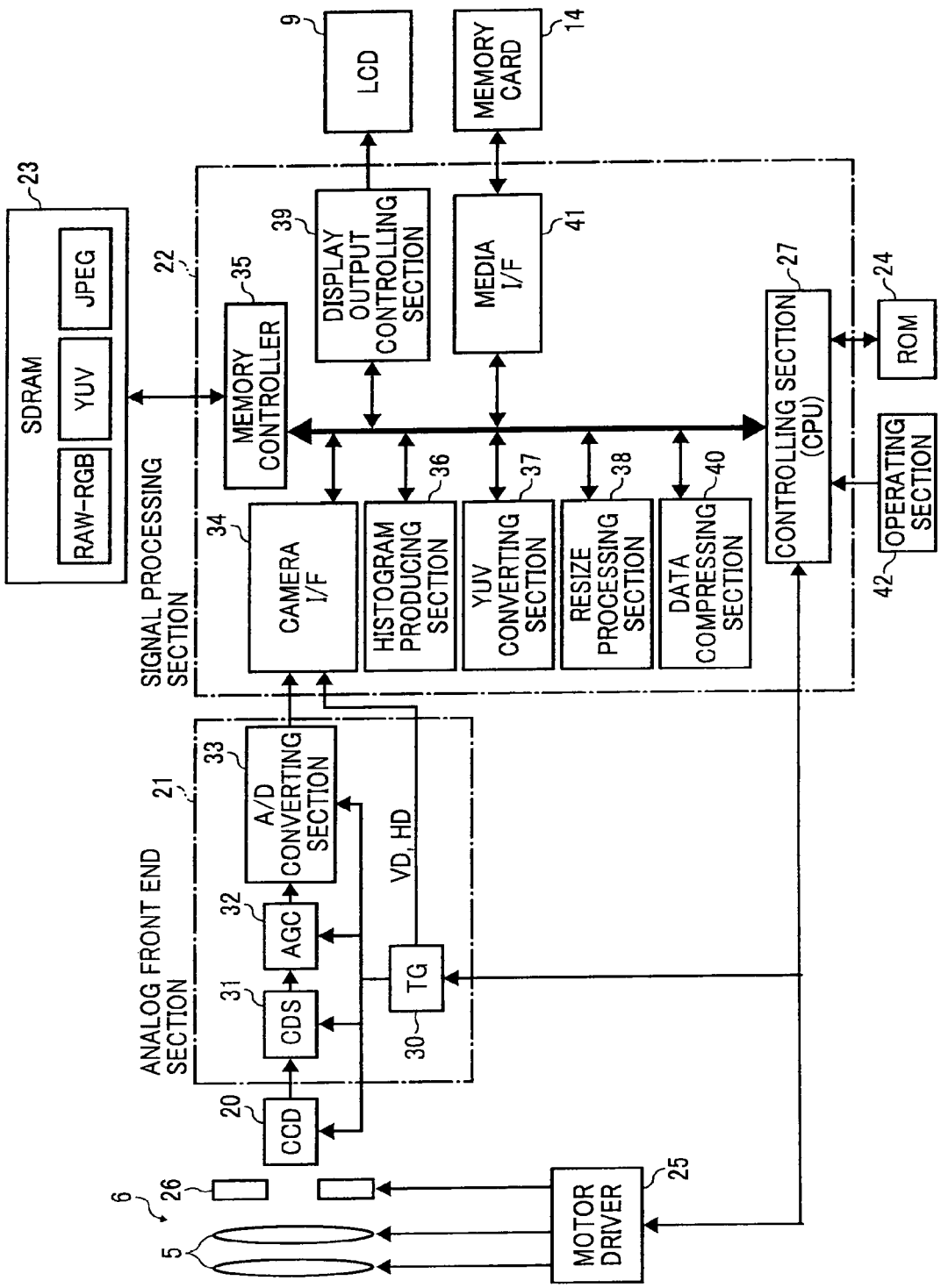
FIG. 2 is a schematic block diagram illustrating a system configuration in the digital camera as an example of the imaging apparatus according to Embodiment 1 of the present invention.

FIG. 1A is a front view, FIG. 1B is a top view, and FIG. 1C is a back view of a digital still camera (hereinafter, it is referred to as a "digital camera") as an example of an imaging apparatus according to Embodiment 1 of the present invention. FIG. 2 is a schematic block diagram illustrating a system configuration in the digital camera illustrated in FIGS. 1A to 1C.

(External Appearance Configuration of a Digital Camera)

As illustrated in FIGS. 1A to 1C, on a top side of the digital camera 1 (an imaging apparatus) according to the present embodiment, a shutter release button (shutter button) 2, a power button 3, and a shooting/playback switch dial 4 are provided. On a front side of the digital camera 1, a lens barrel unit 6 having a photographing lens system 5 (an optical system), a stroboscopic light emitting section (flash) 7, and an optical viewfinder 8 are provided.

On a back side of the digital camera 1, a liquid crystal display (LCD) monitor 9 (a display device), an eyepiece lens section 8a of the optical viewfinder 8, a wide angle zoom (W) switch 10, a telephoto zoom (T) switch 11, a menu (MENU) button 12, a confirmation (OK) button 13 and so on are provided. Additionally, inside a side of the digital camera 1, a memory card storing section 15 is provided. The memory card storing section 15 stores a memory card 14 (see FIG. 2) which stores shot image data.

(System Configuration of the Digital Camera)

As illustrated in FIG. 2, the digital camera 1 has a CCD (Charge-Coupled Device) 20 (an image sensor) as a solid-state image sensor, an analog front end section 21 (hereinafter, it is referred to as an "AFE section."), a signal processing section 22, an SDRAM (Synchronous Dynamic Random Access Memory) 23, a ROM (Read Only Memory) 24, a motor driver 25 and so on. The CCD 20 as the solid-state image sensor images light incident from a photographic subject via the photographing lens system 5 of the lens barrel unit 6 on a light receiving surface as an image of the photographic subject. The AFE section 21 converts an electric signal (an analog RGB image signal) outputted from the CCD 20 to a digital signal. The signal processing section 22 processes the digital signal outputted from the AFE section 21. The SDRAM 23 temporarily stores data. A control program, a plurality of conversion graphs for performing a bit compression to convert 14-bit data to 12-bit data, which are described later, and so on are kept in the ROM 24. The motor driver 25 drives the lens barrel unit 6.

The lens barrel unit 6 comprises the photographing lens system 5, and a mechanical shutter unit 26. The photographing lens system 5 has a zoom lens, a focus lens and so on. Each driver unit of the photographing lens system 5 and the mechanical shutter unit 26 is driven by the motor driver 25. The motor driver 25 is driven and controlled by a driving signal from a controlling section (CPU, Central Processing Unit) 27 (a calculator) of the signal processing section 22. The mechanical shutter unit 26 also has an aperture function.

The CCD 20 comprises a plurality of pixels 20a. An RGB primary-color filter (see FIG. 6 and hereinafter, it is referred to as an "RGB filter.") is placed on the plurality of pixels. The CCD 20 outputs an electric signal (an analog RGB image signal) corresponding to RGB, the three primary colors.

The AFE section 21 comprises a TG (a timing signal generating section) 30, a CDS (a correlated double sampling section) 31, an AGC (an analog gain controlling section) 32, and an A/D converting section (an analog/digital converting section) 33. The TG 30 drives the CCD 20. The CDS 31 samples the electric signal (the analog RGB image signal) which is outputted from the CCD 20. The AGC 32 adjusts a gain of the image signal which is sampled in the CDS 31. The A/D converting section 33 converts the image signal which is gain-adjusted in the AGC 32 to a digital signal (hereinafter, it is referred to as "RAW-RGB data").

The signal processing section 22 comprises a camera interface (hereinafter, it is referred to as a "camera I/F") 34, a memory controller 35, a histogram producing section 36 (a histogram producer), a YUV converting section 37, a resize processing section 38, a display output controlling section 39, a data compressing section 40, a media interface (hereinafter, it is referred to as a "media I/F") 41, and the controlling section (CPU) 27. The camera I/F 34 receives outputs of a picture horizontal synchronizing signal (HD), a picture vertical synchronizing signal (VD) and a pixel transfer clock (pixel clock) from the TG 30 of the AFE section 21, and loads RAW-RGB data outputted from the A/D converting section 33 of the AFE section 21 synchronizing with these synchronizing signals. The memory controller 35 controls the SDRAM 23. The histogram producing section 36 produces a brightness histogram based on the RAW-RGB data. The YUV converting section 37 converts the RAW-RGB data to image data in YUV format which is displayable and recordable. The resize processing section 38 changes a size of an image in accordance with the size of the image data which is displayed or recorded. The display output controlling section 39 controls a display output of the image data. The data compressing section 40 records the image data in JPEG format and so on. The media I/F 41 writes the image data in the memory card 14 and reads out the image data written in the memory card 14. The controlling section (CPU) 27 performs a whole system control of the digital camera 1 and so on by the control program kept in the ROM 24 based on operating information inputted from an operating section 42. The signal processing section 22 is constructed as one IC (Integrated Circuit).

The camera I/F has a calculating function of an AF (Auto Focus) evaluation value which is described later, an AE (Auto Exposure) evaluation value, and an AWB (Auto White Balance) evaluation value by the loaded RAW-RGB data by the A/D converting section of the AFE section 21. The AF evaluation value describes a focusing level of a photographic subject image. The AE evaluation value describes a brightness level of the photographic subject image. The AWB evaluation value describes a color tone of the image of the photographic subject.

The operating section 42 comprises the shutter release button 2, the power button 3, the shooting/playback switch dial 4, the wide angle zoom switch 10, the telephoto zoom switch 11, the menu (MENU) button 12, the confirmation (OK) button 13 and the like on an external surface of the digital camera 1 (see FIGS. 1A to 1C). A predetermined operation indicating signal is inputted to the controlling section 27 by an operation of a user.

In the SDRAM 23, the RAW-RGB data loaded in the camera I/F 34, YUV data (image data in YUV format) which is converted in the YUV converting section 37, additionally, image data in JPEG format which is compressed in the data compressing section 40 and so on are stored.

Y in YUV is brightness data. U and V in the YUV provide color information. The U is a color difference between brightness data and blue data (B), and the V is a color difference between brightness data and red data (R). The YUV is a format in which colors are expressed by these three, the Y, U, and V.

Figure 3:
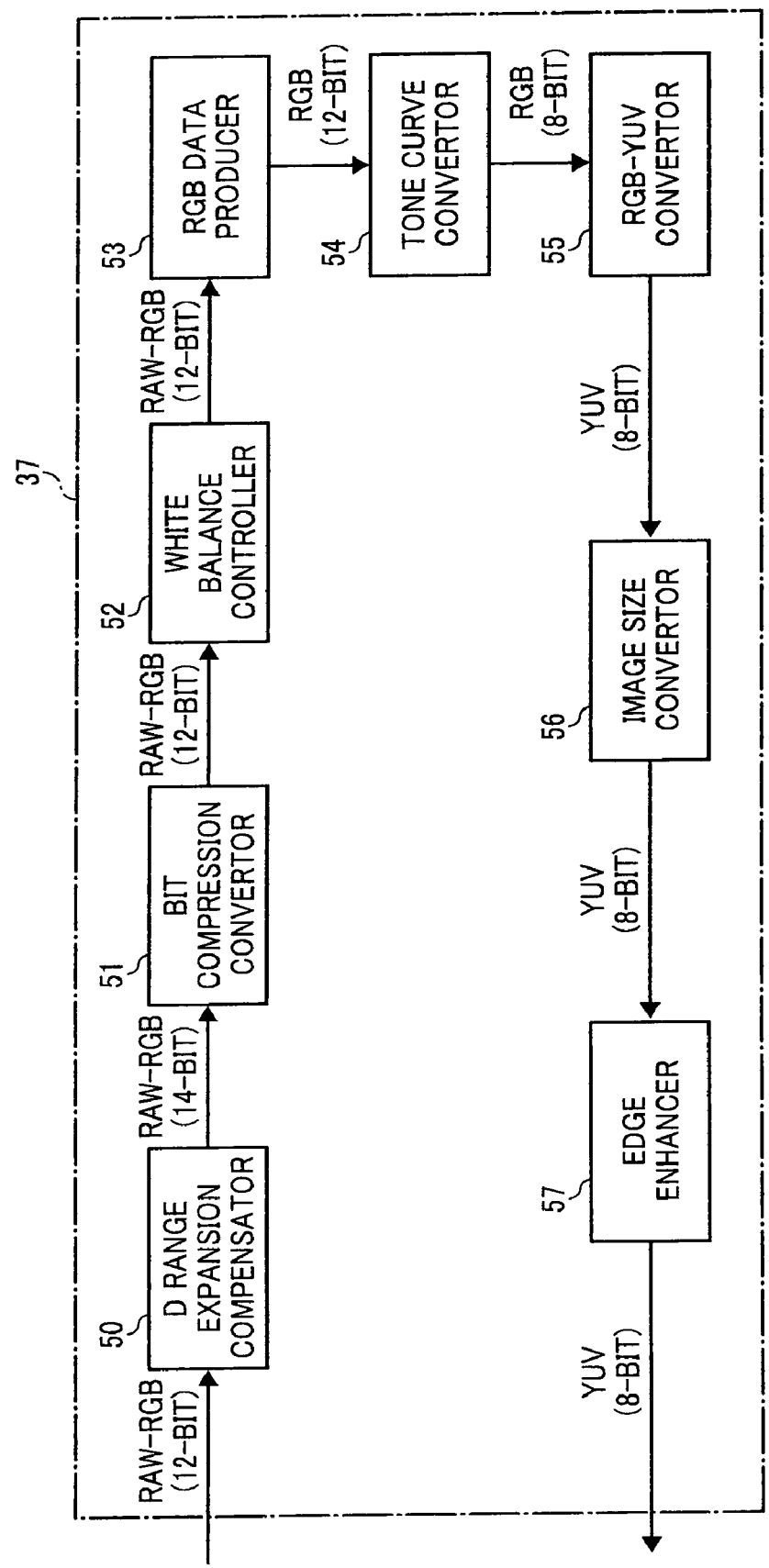
FIG. 3 is a block diagram illustrating a configuration of a YUV converting section 37 in Embodiment 1 of the present invention.

As illustrated in FIG. 3, the YUV converting section 37 comprises a dynamic range expansion compensator (hereinafter, it is referred to as a "D range expansion compensator") 50, which is described later, a bit compression convertor 51, a white balance controller 52, an RGB data producer 53, a tone curve convertor 54, an RGB-YUV convertor 55, an image size convertor 56, and an edge enhancer 57.

(Monitoring (Live-Preview) Operation and Ordinary Still Image Shooting Operation of the Digital Camera)

Next, a monitoring operation and an ordinary still image shooting operation of the digital camera 1 will be explained. In the ordinary still image shooting mode, the monitoring operation and the still image shooting operation as described below are performed.

Firstly, the power button 3 is turned on by a user, the shooting/playback switch dial 4 is set to a shooting mode, and then the digital camera 1 starts operating in a recording mode. When the controlling section 27 detects that the power button 3 is turned on and the shooting/playback switch dial 4 is set to the shooting mode, the controlling section 27 outputs a control signal to the motor driver 25 to move the lens barrel unit 6 to a position where shooting is possible and to start operating the CCD 20, the AFE section 21, the signal processing section 22, the SDRAM 23, the ROM 24, the LCD monitor 9 and the like.

The photographing lens system 5 of the lens barrel unit 6 is aimed at a photographic subject, and thereby light incident from the photographic subject via the photographing lens system 5 is imaged on a light receiving surface of each pixel of the CCD 20 as an image of the photographic subject. And an electric signal based on the image of the photographic subject outputted from the CCD 20 (an analog RGB image signal) is inputted to the A/D converting section 33 via the CDS 31 and the AGC 32, and then the electric signal is converted to 12-bit RAW-RGB data in the A/D converting section 33.

This RAW-RGB data is loaded to the camera I/F 34 of the signal processing section 22 and is stored in the SDRAM 23 via the memory controller 35. And after the RAW-RGB data which is read out from the SDRAM 23 is converted to YUV data (YUV signal), which is a displayable format, in the YUV converting section 37, the YUV data is stored in the SDRAM 23 via the memory controller 35.

The YUV data which is read out from the SDRAM 23 via the memory controller 35 is transmitted to the LCD monitor 9 via the display output controlling section 39, and a shooting image (moving image) is displayed. When monitoring the shooting image which is displayed on the LCD monitor 9, image data of the shooting image for one frame is read out at 1/30 second (i.e. 30 fps) by the camera I/F 34.

When this monitoring operation is performed, it is in a state where the shooting image is only displayed on the LCD monitor 9 functioning as an electric viewfinder, and the shutter release button 2 is not yet pressed (and not half-pressed, either).

It is possible for the user to check the shooting image by displaying the shooting image on the LCD monitor 9. In addition, a TV video signal is outputted from the display output controlling section 39, and the shooting image (moving image) is also displayed on an external TV (television) via a video cable.

The camera I/F 34 of the signal processing section 22 calculates an AF (Auto Focus) evaluation value, an AE (Auto Exposure) evaluation value, and AWB (Auto White Balance) evaluation value by the RAW-RGB data which is loaded.

The AF evaluation value is calculated by, for example, an output integral value of a high frequency component extraction filter and an integral value of a brightness difference between adjacent pixels. In a focusing state, an edge part of the photographic subject is clear, and the high frequency component is highest. By use of this, in a case where the AF operation is performed (when a focus position detection operation is performed), AF evaluation values in each focus lens position of the photographing lens system 5 are obtained, and a maximum value among them is taken as a focus position detected position, and then the AF operation is performed.

The AE evaluation value and the AWB evaluation value are calculated from each of the accumulated values of RGB values of the RAW-RGB data. For example, an image plane corresponding to the light receiving surface of the entire pixels of the CCD 20 is equally divided into 256 segments (16 horizontal segments and 16 vertical segments), and each of the accumulated values of the RGB values in each of the segments is calculated.

The controlling section 27 reads out each of the accumulated values of the RGB values which is calculated. In an AE operation, the brightness of each of the segments of the image plane is calculated, and an appropriate exposure amount is determined by a distribution of brightness. An exposure condition (the number of releases of the electric shutter of the CCD 20, an aperture value and the like) is set based on the determined exposure amount. In an AWB operation, a control value of the AWB corresponding to a color of a light source of the photographic subject is determined based on a distribution of RGB. This AWB operation adjusts a white balance when the RAW-RGB data is converted to the YUV data in the YUV converting section 37. The AE operation and the AWB operation are continuously performed while the monitoring operation is performed.

As for shooting a still image, while the monitoring operation described above is performed, if a still image shooting operation in which the shutter release button 2 is pressed (from half-pressed to fully-pressed) is started, the AF operation which is the focus position detecting operation and a still image recording operation are performed.

That is, when the shutter release button 2 is pressed (from half-pressed to fully-pressed), a focus lens of the photographing lens system 5 is moved by a drive command from the controlling section 27 to the motor driver 25, and for example, the AF operation of a contrast evaluation system is performed.

In a case where the AF (focus) coverage is an entire area from infinity to the closest, the focus lens of the photographing lens system 5 is moved in a distance from the closest to infinity or the distance from infinity to the closest, and the controlling section 27 reads out the AF evaluation value in each focus lens position which is calculated in the camera I/F 34. And the focus lens is moved to the focus position where the AF evaluation value of each focus lens position is maximum, and the AF operation is achieved.

Then the AE operation described above is performed. When completing an exposure, the mechanical shutter unit 26 is closed by a drive command from the controlling section 28 to the motor driver 25, and an analog RGB image signal for a still image is outputted from the CCD 20. And the analog RGB image signal for the still image is converted to RAW-RGB data in the A/D converting section 33 of the AFE section 21 as well as when monitoring as described above.

This RAW-RGB data is loaded into the camera I/F 34 of the signal processing section 22, and is converted to YUV data in the YUV converting section 37, and then is stored in the SDRAM 23 via the memory controller 35. This YUV data is read out from the SDRAM 23, and is converted to a size corresponding to the number of recording pixels in the resize processing section 38, and then is compressed to image data in JPEG format and so on in the data compressing section 40. After this compressed image data in JPEG format and so on is restored in the SDRAM 23, this compressed image data is read out from the SDRAM 23 via the memory controller 35, and then is stored in the memory card 14 via the media I/F 41.

The digital camera 1 of the present embodiment has a dynamic expansion mode which expands a dynamic range other than the above-described ordinary still image shooting mode.

(A Principle of Dynamic Range Expansion of the Present Invention)

On each pixel comprising the CCD 20 of the digital camera 1, an RGB filter (see FIG. 6) of Bayer arrangement is placed. In a general RGB filter, with respect to light which has a wide wavelength range such as sunlight, a sensitivity to the brightness of each color, R (red), G (green), and B (blue) is different.

Figure 4:
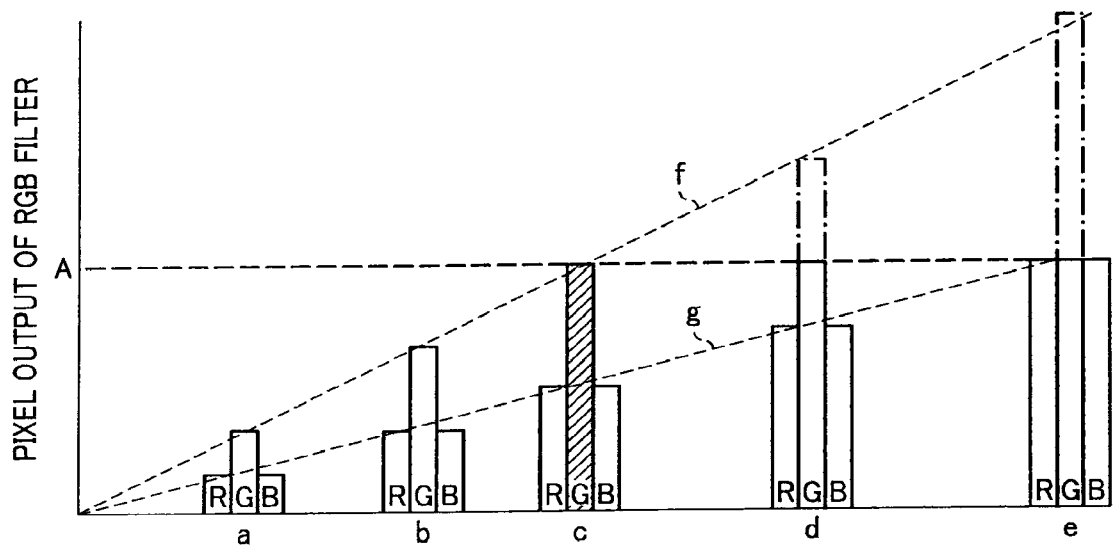
FIG. 4 is a diagram illustrating a principle of a dynamic range expansion in the present invention.

For example, as illustrated in FIG. 4, in a case where the CCD 20 has an RGB filter ("a", "b", and "c" in FIG. 4) with a sensitivity in which a sensitivity of a G (green) filter is approximately twice as high as sensitivities of R (red) and B (blue) filters, when the same amount of light, which has a wide wavelength range such as sunlight, is incident on the RGB filter, a pixel output of the G filter (a shaded part of "c" in FIG. 4) reaches a saturation level A (a dotted line A) earlier, compared to each pixel output of the R and B filters. In FIG. 4, a dotted-line "f" illustrates a pixel sensitivity characteristic of the G filter and a dotted-line "g" illustrates each pixel sensitivity characteristic of the R and B filters. The pixel sensitivity characteristic of the G filter has approximately a twofold sensitivity compared to each pixel sensitivity characteristic of the R and B filters.

Incidentally, in a digital camera including a solid-state image sensor such as a CCD and the like having a general RGB filter, as the RGB filter of the "a", "b", and "c" in FIG. 4, a range of the dynamic range is set corresponding to the saturation level A based on the pixel output of the G filter which has high sensitivity. That is, in a case where the pixel output of the G filter reaches the saturation level A, the pixel output of the R and B filters is approximately a half (½) of the saturation level A.

On the other hand, in the present invention, as the RGB filters of "d" and "e" in FIG. 4, if the pixel output of the G filter exceeds the saturation level A, when each pixel output of the R and B filters is within the saturation level A, from each pixel output level of the R and B filters, on the basis of each pixel sensitivity characteristic of the R and B filters (the dotted-line "g" in FIG. 4) and the pixel sensitivity characteristic of the G filter (the dotted-line "f" in FIG. 4), the pixel output of the G filter is compensated (dash-dot line parts in FIG. 4) and the dynamic range is expanded corresponding to only an amount compensated as described above.

In the present embodiment as described above, with respect to light which has a wide wavelength range such as sunlight, the pixel sensitivity characteristic of the G filter has approximately a twofold sensitivity compared to each pixel sensitivity characteristic of the R and B filters. Therefore, a maximum value of a dynamic range expansion level in the present embodiment is approximately twofold compared to an ordinary still image shooting operation without performing a dynamic range expansion operation.

In the present embodiment, the pixel sensitivity characteristic of the filter has approximately a twofold sensitivity compared to each pixel sensitivity characteristic of the R and B filter, and the maximum value of the dynamic range expansion level is approximately twofold. However, by changing each pixel sensitivity characteristic of the RGB filter, it is possible to set the maximum value of the dynamic range expansion level to be a predetermined value which is equal to or more than twofold, or a predetermined value which is less than or equal to twofold.

(Configuration of the D Range Expansion Compensator 50)

Figure 5:
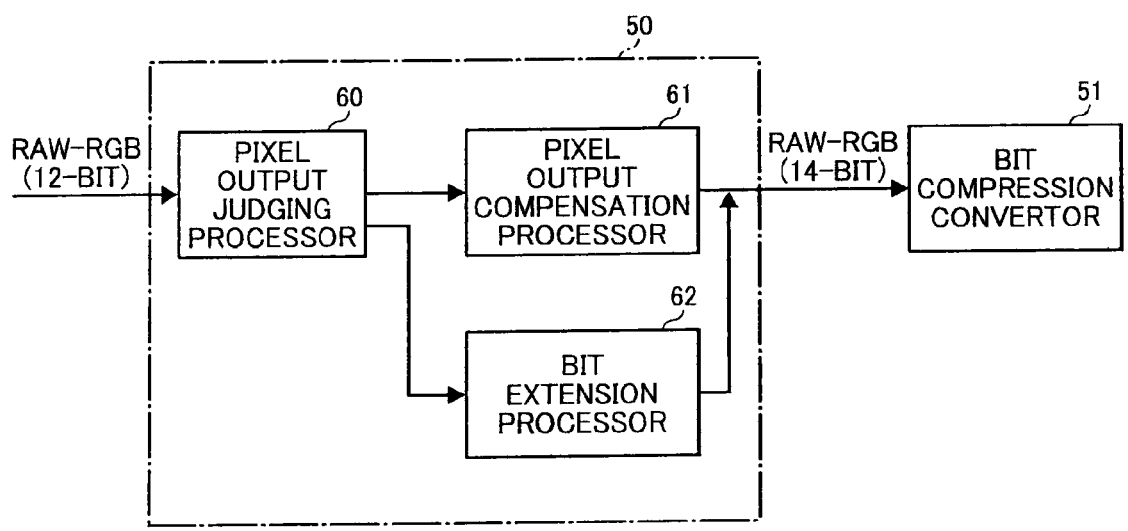
FIG. 5 is a block diagram illustrating a configuration of a D (dynamic) range expansion compensator 50 in Embodiment 1 of the present invention.

The D range expansion compensator 50 of the YUV converting section 3 illustrated in FIG. 3 has a dynamic range expansion operation function to expand a dynamic range. As illustrated in FIG. 5, the D range expansion compensator 50 comprises a pixel output judging processor 60, a pixel output compensation processor 61, and a bit extension processor 62.

The pixel output judging processor 60 detects a pixel output of each pixel provided with an RGB filter from the inputted RAW-RGB data, and judges whether each of a pixel output of the pixel provided with the G filter (hereinafter, it is referred to as "pixel output of G filter") and pixel outputs of pixels provided with the R and B filters (hereinafter, it is referred to as "pixel outputs of R and B filters") in the vicinity of the pixel provided with the G filter reach a saturation level which is set beforehand. And additionally in a case where the pixel output judging processor 60 judges that the pixel output of the G filter which has highest sensitivity reaches the saturation level, the pixel output judging processor 60 calculates a compensation coefficient, which is described later, to compensate the pixel output of the G filter based on the pixel outputs of the R and B filters in the vicinity of the G filter.

The pixel output compensation processor 61 performs a compensating operation of the pixel output of the G filter by multiplying the pixel output of the G filter by the compensation coefficient calculated in the pixel output judging processor 60.

The bit extension processor 62 performs only a bit extension to convert pixel output data of the R and B filters from 12-bit data to 14-bit data each without performing a compensation of an output level, in a case where the pixel output judging processor 60 judges that the pixel output of the G filter reaches the saturation level as described above. The bit extension processor 62 performs only a bit extension to convert each pixel output data of the RGB filter from 12-bit data to 14-bit data without performing a compensation of an output level, in a case where the pixel output judging processor 60 judges that each pixel output of the RGB filter does not reach the saturation level.

Figures 6, 7:
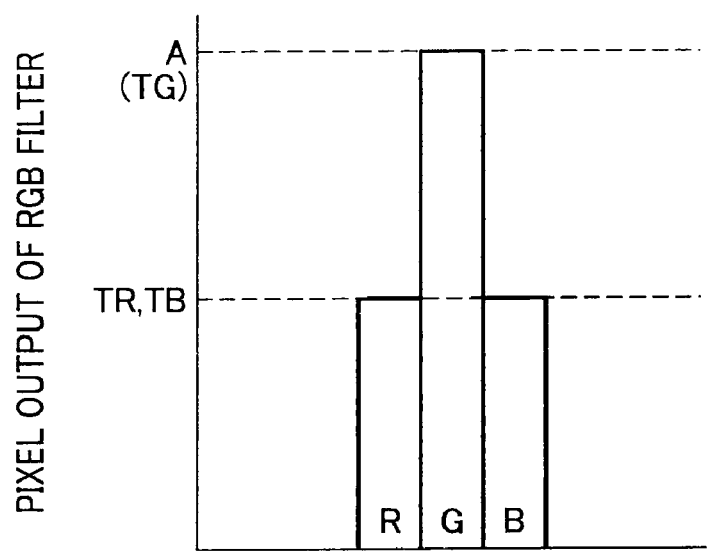
FIG. 6 illustrates an arrangement position and a processing unit of an RGB filter in Embodiment 1 of the present invention.
FIG. 7 illustrates predetermined saturation judging levels (TG, TR, TB) of each pixel output of an RGB filter.

In a case where the compensation coefficient for the pixel output of the G filter is calculated in the pixel output judging processor 60, in the present embodiment, for each pixel of the CCD 20 having the RGB filter, 2×2 pixels (2 pixels of the G filter, 1 pixel of the R filter, and 1 pixel of the B filter) in a bold-line frame A are taken as a processing unit (minimum unit), as illustrated in FIG. 6. A compensation coefficient (K) of the pixel output of the G filter, and a pixel output (Ge) of the G filter after performing the compensating operation are calculated respectively by a formula (1) and a formula (2) below.

$$K = \{l \times f(Ra) + m \times f(Ga) + n \times f(Ba)\}/3 \qquad \text{formula (1)}$$

$$Ge = K \times Ga \qquad \text{formula (2)}$$

In the above formulas (1) and (2), l, m, and n are coefficients which are set based on sensitivity rates of each filter of the RGB filter and Ga is a pixel output of the G filter before performing the compensating operation. f(Ra), f(Ga), and f(Ba) are coefficients which are set by Number 1 (formulas (3) to (5)) below.

[Number 1]

If $Ra \leq TR : f(Ra) = 1$

If $Ra > TR : f(Ra) = Ra/TR$ \qquad formulas (3)

If $Ga < TG : f(Ga) = 1$

If $Ga = TG : f(Ga) = Ga/TG$ \qquad formulas (4)

If $Ba \leq TB : f(Ba) = 1$

If $Ba > TB : f(Ba) = Ba/TB$ \qquad formulas (5)

Ra is a pixel output value of the R filter, TR is a saturation judging level of a pixel output of the R filter, Ga is a pixel output value of the G filter before the compensating operation, TG is a saturation level of a pixel output of the G filter, Ba is a pixel output value of the B filter, and TB is a saturation judging level of a pixel output of the B filter.

The saturation judging levels TR, TG and TB in the above formulas (3) to (5) correspond to predetermined saturation judging levels of each pixel output of the RGB filters, for example, under a light source illustrated in FIG. 7. In FIG. 7, A (TG) is the saturation level (saturation judging level) of the pixel output of the G filter, TR is the saturation judging level of the pixel output of the R filter, and TB is the saturation judging level of the pixel output of the B filter.

In the formulas (3) to (5), in a case where each pixel output of the RGB filter is less than or equal to the predetermined saturation levels (TR, TG, TB), each coefficient f(Ra), f(Ga) and f(Ba) is set to be "1". This is in order that a value of the pixel output of the G filter after the compensation (Ge) does not become smaller than a value of the pixel output of the G filter before the compensation (Ga).

As described above, a sensitivity of the pixel provided with the G filter is twice as high as those of the pixel provided with the R and B filters; therefore the pixel output of the G filter firstly reaches the saturation level A. An output value which reaches the saturation level A is taken as a saturation judging level TG of the pixel output of the G filter, and saturation judging levels TR and TB of each pixel output of the R and B filters are set to ½ value of the TG. TR and TB are taken as the saturation judging levels of the pixel outputs of the R and B filters, respectively. TR, TG, and TB depend on a sensitivity rate of a solid-state image sensor (CCD and the like) having an RGB filter used for an imaging apparatus (digital camera and the like); therefore they are not limited to a proportion as illustrated in FIG. 7.

As described in formulas (1) to (5), a ratio between each pixel output of the RGB filter and each saturation judging level TR, TG, and TB is calculated, respectively, and then a coefficient to compensate the pixel output of the G filter is calculated by multiplying the above calculated values by coefficients set by sensitivity rates of each filter of the RGB filter and averaging. Then a pixel output of the G filter after performing the compensating operation is calculated by multiplying the pixel output of the G filter by a compensation coefficient (K) which is calculated. And a value of the pixel output (Ge) of the G filter after performing the compensating operation calculated from the above formula (2) used by this compensation coefficient (K) is replaced as a value of the pixel output of 2 G filters in the processing unit (see FIG. 6).

This value of the pixel output of the G filter becomes data which exceed a value of 12-bit data; therefore the value of the pixel output of the G filter is once converted to 14-bit data. Accordingly, both maximum values of the pixel outputs of the R and B filters are 4095 (12-bit), and the maximum value of the pixel output of the G filter becomes 8190; therefore it can be treated as 14-bit data.

Incidentally, before the compensation coefficient of the pixel output of the G filter is calculated in the pixel output judging processor 60, an output compensation of a defective pixel needs to be completed. That is, in a case where there is a defective pixel in each pixel output provided with the RGB filter and there is a pixel which outputs a value which is always saturated, the compensation coefficient (K) becomes a larger value, and as a result, the pixel output of the G filter after the compensation is replaced as a larger value; therefore a new defective pixel is produced.

Therefore, in a case where the pixel output judging processor 60 judges that there is a defective pixel in the processing unit (2×2 pixels), not the defective pixel but a pixel having the same color filter as the defective pixel in a vicinity of the processing unit is used instead of the defective pixel. In this way, in a case where the pixel output judging processor 60 judges if the pixel output of the G filter reaches the saturation level or not, it is unnecessary for a defective pixel to be used. Accordingly, even in a case where the pixel output of the G filter reaches the saturation level, a highly-accurate compensation of a saturated pixel is always performed.

In addition, in the present embodiment, by setting a processing unit when judging each pixel output as described above to a minimum necessary size of 2×2 pixels in horizontal and vertical directions, a memory used for judging each pixel output can be reduced, and additionally a higher-speed judging operation of the pixel output can be achieved.

Figure 8:
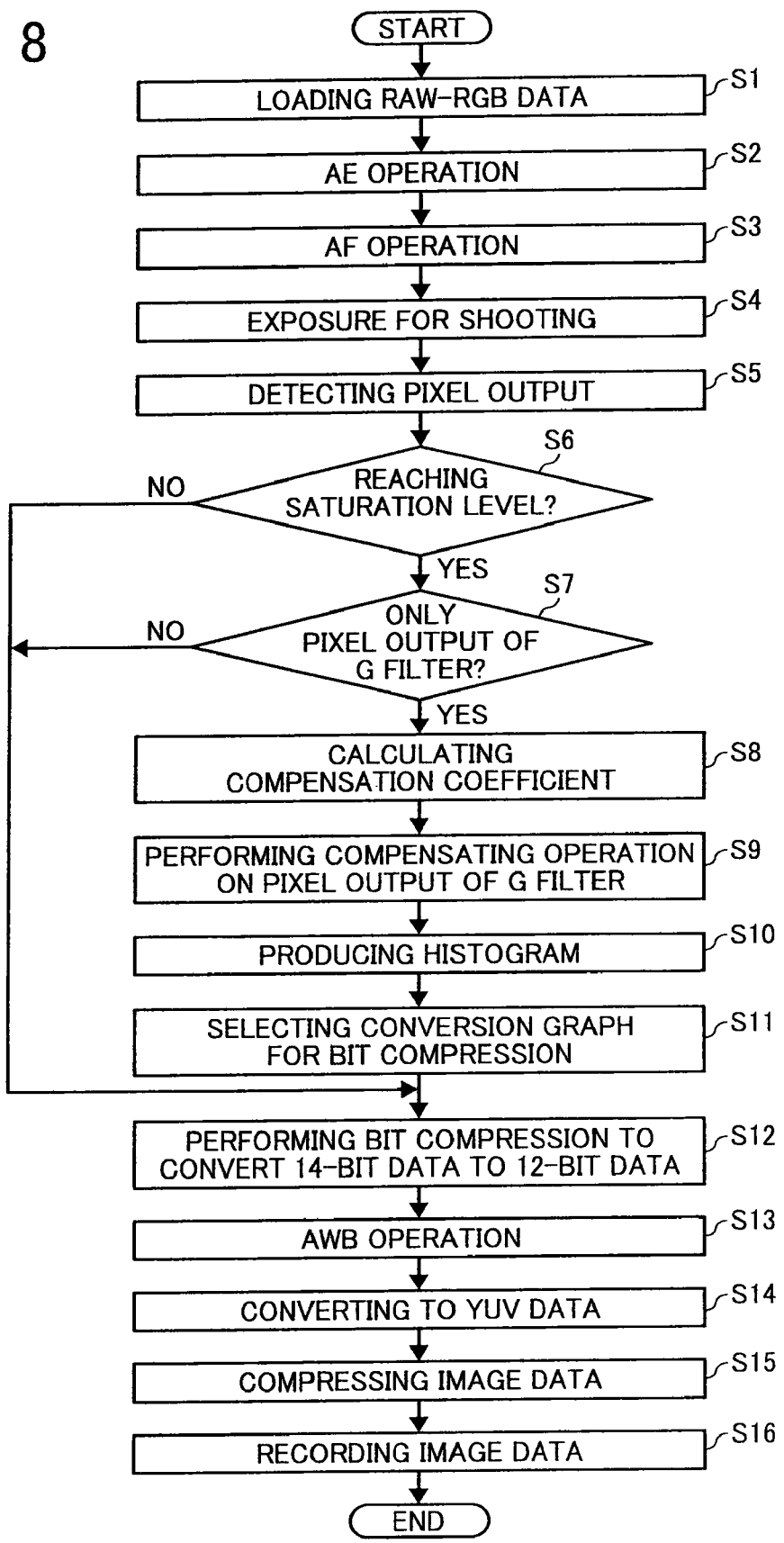
FIG. 8 is a flow chart illustrating a still image shooting operation in a dynamic range expansion mode in Embodiment 1 of the present invention.

Next, the above-described still image shooting operation in the dynamic range expansion mode in the present embodiment will be explained with reference to a flow chart illustrated in FIG. 8.

Figure 9:
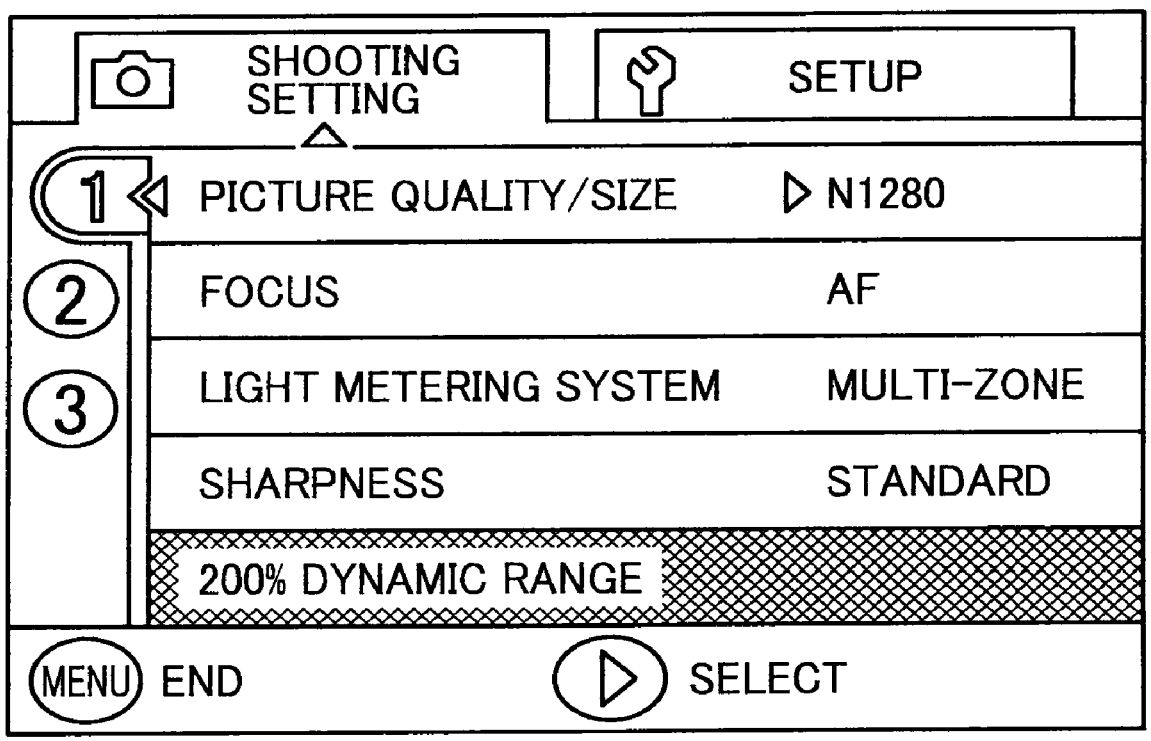
FIG. 9 illustrates an example of a shooting setting screen displayed on an LCD (Liquid Crystal Display) monitor in Embodiment 1 of the present invention.

For example, in a case where there is an extremely bright part in a part of a background of a photographic subject, a user presses the menu (MENU) button 12 (see FIG. 1C). And a shooting setting screen (an operation selector) as illustrated in FIG. 9 is displayed on the LCD monitor 9 and the user selects an item of "200% dynamic range" from the screen, and thereby a control signal is outputted from the controlling section 27 to the YUV converting section 37 and a dynamic range expansion mode which expands the dynamic range twice is performed.

Then the user presses the shutter release button 2 (from a half-pressed state to a fully-pressed state), and thereby the camera I/F 34 of the signal processing section 22 loads RAW-RGB data via the photographing lens system 5, the CCD 20 and the AFE section 21 (step S1).

Then the camera I/F 34 calculates an AE (Auto Exposure) evaluation value, an AF (Auto Focus) evaluation value, and an AWB (Auto White Balance) evaluation value from the loaded RAW-RGB data. The controlling section 27 performs an AE operation based on the calculated AE evaluation value and determines an exposure when shooting (step S2). In addition, the controlling section 27 performs an AF operation based on the calculated AF evaluation value, and moves a focus lens of the photographing lens system 5 to a focus position for focusing (step S3).

And an exposure for shooting (recording) is performed based on the exposure condition determined in the step S2 (step S4), and an image of a photographic subject is formed on a light receiving surface of each pixel of the CCD 20. Then, an electric signal (analog RGB image signal) based on the image of the photographic subject outputted from the CCD 20 is outputted to the A/D converting section 33 via the CDS 31 and the AGC 32, and is converted to 12-bit RAW-RGB data. This RAW-RGB data is loaded to the camera I/F of the signal processing section 22 and is stored in the SDRAM 23 via the memory controller 35. Steps as thus far described are the same as the above-described ordinary still image shooting operation.

The RAW-RGB data read out from the SDRAM 23 is inputted to the D range expansion compensator 50 of the YUV converting section 37, and as described above, the pixel output judging processor 60 of the D range expansion compensator 50 detects a pixel output of each pixel provided with the RGB filter (step S5) and judges if the pixel output of each pixel provided with the RGB filter reaches a saturation level which is set beforehand (step S6). In a case where the pixel output judging processor 60 judges that there is at least one pixel output which reaches the saturation level (YES of step S6), the pixel output judging processor 60 judges if the pixel output which reaches the saturation level is only a pixel output of G filter which has highest sensitivity (step S7).

In the step S7, in a case where the pixel output judging processor 60 judges that the pixel output which reaches the saturation level is only the pixel output of the G filter (YES of step S7), the pixel output judging processor 60 calculates a compensation coefficient to compensate the pixel output of the G filter by the formula (1) and the formulas (3) to (5) (step S8). And then, the pixel output compensation processor 61 multiplies the pixel output of the G filter by the compensation coefficient calculated by the step S7 as described by the formula (2), and performs a compensating operation on the pixel output of the G filter (step S9).

A brightness histogram of the image of the photographic subject is produced based on the RAW-RGB data by the histogram producing section 36 (step S10). And the controlling section 27 calculates a ratio of the number of pixels of a maximum brightness area to the number of entire pixels of a brightness distribution from the histogram produced in the step S10 as described later, and based on the calculated ratio, an appropriate conversion graph in the case of performing a bit compression to convert the pixel output data of the G filter extended (converted) to 14-bit data in the D range expansion compensator 50 (pixel output judging processor 60, pixel output compensation processor 61) to 12-bit data in the bit compression convertor 51 is selected by a following judging operation (step S11).

In the ROM 24, 2 conversion graphs to perform a bit compression to convert 14-bit data to 12-bit data, for example, as illustrated in FIGS. 10A and 10B are stored. In FIGS. 10A and 10B, a dotted-line square "a" illustrates a range of 12-bit data.

Figure 11A:
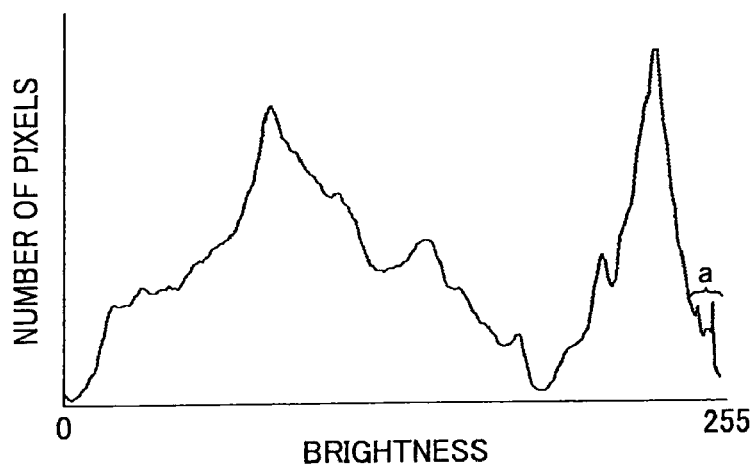
FIG. 11A illustrates a histogram of brightness of a shooting image.

In the histogram of the brightness distribution produced in the step S10, as illustrated in FIG. 11A, for example, a vertical axis indicates the number of pixels and a horizontal axis indicates a range of a brightness value (0-255), and here the horizontal axis is divided into 32 areas, for example. In the step S11, the controlling section 27 judges if a ratio of the number of pixels of a maximum brightness area (area "a" of FIG. 11A) is, for example, equal to or more than 3% of the number of the entire pixels. The number of the above divided areas, 32, is an example; therefore the number of the divided areas may be arbitrary according to a shooting scene and so on. Additionally, in the present embodiment, a criteria for judgment (predetermined threshold value) of a ratio of the number of pixels of the maximum brightness area to the number of the entire pixels is set to 3%; however, the criteria for judgment may be arbitrarily set according to the number of the divided areas, the shooting scene and so on.

In a case where the controlling section 27 judges that the ratio of the number of pixels of the maximum brightness area is equal to or more than 3% of the number of the entire pixels, the conversion graph illustrated in FIG. 10A is selected. In a case where the controlling section 27 judges that the ratio of the number of pixels of the maximum brightness area is less than 3% of the number of the entire pixels, the conversion graph illustrated in FIG. 10B is selected.

The histogram illustrated in FIG. 11A is a histogram produced when shooting scenery in cloudy weather, and an image of a photographic subject in which there are a few parts where whiteout occurs (an image of a photographic subject in which there are a few pixel outputs which reach the saturation level), and the ratio of the number of pixels of the high brightness area with respect to the number of the entire pixels is less than 3%.

The bit compression convertor 51 reads out the selected conversion graph from the ROM 24 by the control signal from the controlling section 27, and performs a bit compression to convert 14-bit data to 12-bit data, by use of the read-out conversion graph (step S12).

The conversion graph illustrated in FIG. 10A is a conversion characteristic such that when a value of input 14-bit data is 8190 a value of output 12-bit data becomes a maximum of 4095 (a three-sectional broken line approximation characteristic in which two sectional points are specified and intervals between these two sectional points are approximated by a straight line), and the conversion graph illustrated in FIG. 10B is a conversion characteristic such that when a value of input 14-bit data is 6142 a value of output 12-bit data becomes a maximum of 4095 (a three-sectional broken line approximation characteristic in which two sectional points are specified and intervals between these two sectional points are approximated by a straight line). The bit compression convertor 51 also performs the bit compression to convert the extended (converted) pixel output data of the R and B filters from 14-bit data to 12-bit data based on the conversion graph used in the case of performing the bit compression to convert the pixel output data of the G filter from the 14-bit data to the 12-bit data.

A bit allocation in a high brightness side can be increased by use of the conversion graph illustrated in FIG. 10A compared to by use of the conversion graph illustrated in FIG. 10B. Therefore, in the case of an image of a photographic subject such that the ratio of the number of pixels of the maximum brightness area is equal to or more than 3% of the number of the entire pixels, for example, like a brightness histogram produced when shooting scenery with a bright sky in fine weather, the conversion graph illustrated in FIG. 10A is selected, and thereby the bit allocation in the high brightness side is increased, and appropriate tone and contrast in an entire brightness range including the high brightness part can be obtained.

Figure 11B:
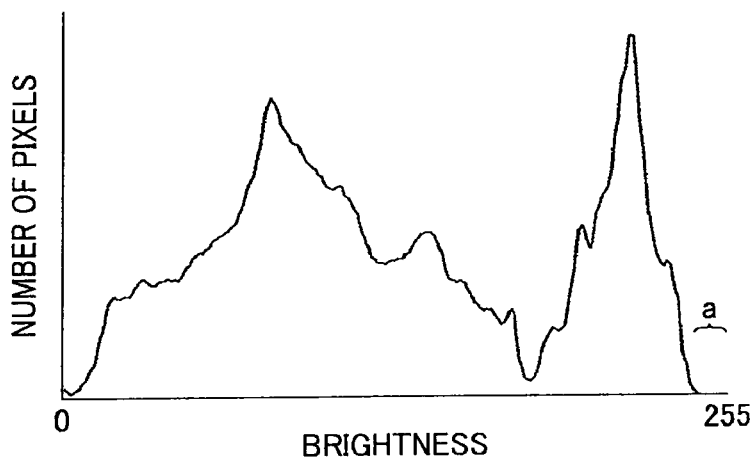
FIG. 11B illustrates an example of a histogram produced when a bit compression is performed on the histogram illustrated in FIG. 11A by use of the conversion graph illustrated in FIG. 10A.

On the other hand, also in the case of an image of a photographic subject such that the ratio of the number of pixels of the maximum brightness area is less than 3% of the number of the entire pixels, for example, like the histogram produced when shooting scenery in cloudy weather as illustrated in FIG. 11A, if the conversion graph illustrated in FIG. 10A is used, the bit allocation in the high brightness side is increased. Therefore, for example, like a histogram illustrated in FIG. 11B, there is no data of the high brightness part and there is no pixel in the maximum brightness area "a", and an image lacking tone and contrast may be obtained.

Figure 11C:
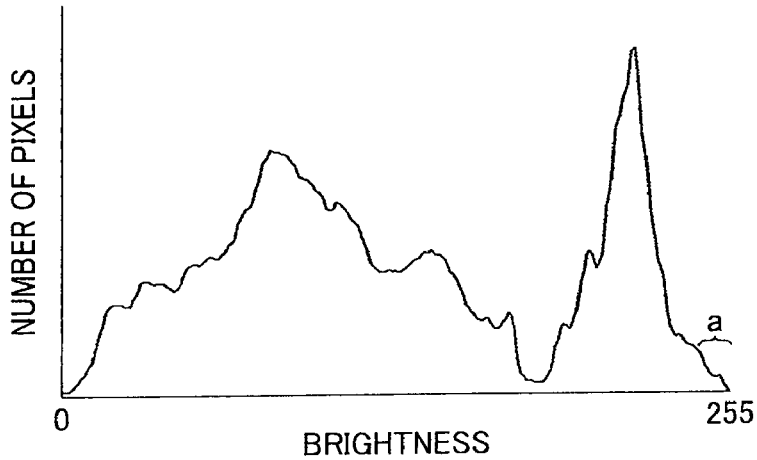
FIG. 11C illustrates an example of a histogram produced when a bit compression is performed on the histogram illustrated in FIG. 11A by use of the conversion graph illustrated in FIG. 10B.

Therefore, in the case of an image of a photographic subject such that the ratio of the number of pixels of the maximum brightness area is less than 3% of the number of the entire pixels, the conversion graph illustrated in FIG. 10B is selected, and thereby, for example, like a histogram illustrated in FIG. 11C, the bit allocation in the high brightness side is reduced and appropriate tone and contrast can be obtained.

In each conversion graph illustrated in FIGS. 10A and 10B, for the data based on the pixel outputs in less than or equal to a predetermined brightness, a compression rate for the bit compression such that the values of the data before and after performing the bit compression become approximately the same is employed, and a tone property in less than or equal to the predetermined brightness can be favorably maintained.

Then, each pixel output data of the RGB filter which is converted from the 14-bit data to the 12-bit data by performing the bit compression in the bit compression convertor 51 is inputted to the white balance controller 52, and a white balance (AWB) operation is performed (step S13). In particular, the white balance controller 52 calculates each inputted pixel output data of the RGB filter, respectively and then outputs. In this case, the controlling section 27 calculates based on the AWB evaluation value calculated in the camera I/F 34 a compensation coefficient to adjust white balance and outputs the compensation coefficient calculated to the white balance controller 52. The white balance controller 52 adjusts white balance based on the compensation coefficient inputted.

In the step S6, in a case where the pixel output judging processor 60 judges that there is no pixel output which reaches the saturation level (NO of step S6), and in the step S7, in a case where the pixel output judging processor 60 judges that not only the pixel output of the G filter but also at least one of the pixel output of the R and B filters reach the saturation level (NO of step S7), without performing operations of the steps S8-S11, the bit compression to convert each pixel output data of the RGB filter extended (converted) to 14-bit data to 12-bit data is performed in the step S12.

Each pixel output data (12-bit) of the RGB filter in which white balance is adjusted in the white balance controller 52 is inputted to the RGB data producer 53. The RGB data producer 53 performs an interpolation calculating operation on RAW data which has only one color data for one pixel and produces all data of RGB for one pixel.

Figure 12:
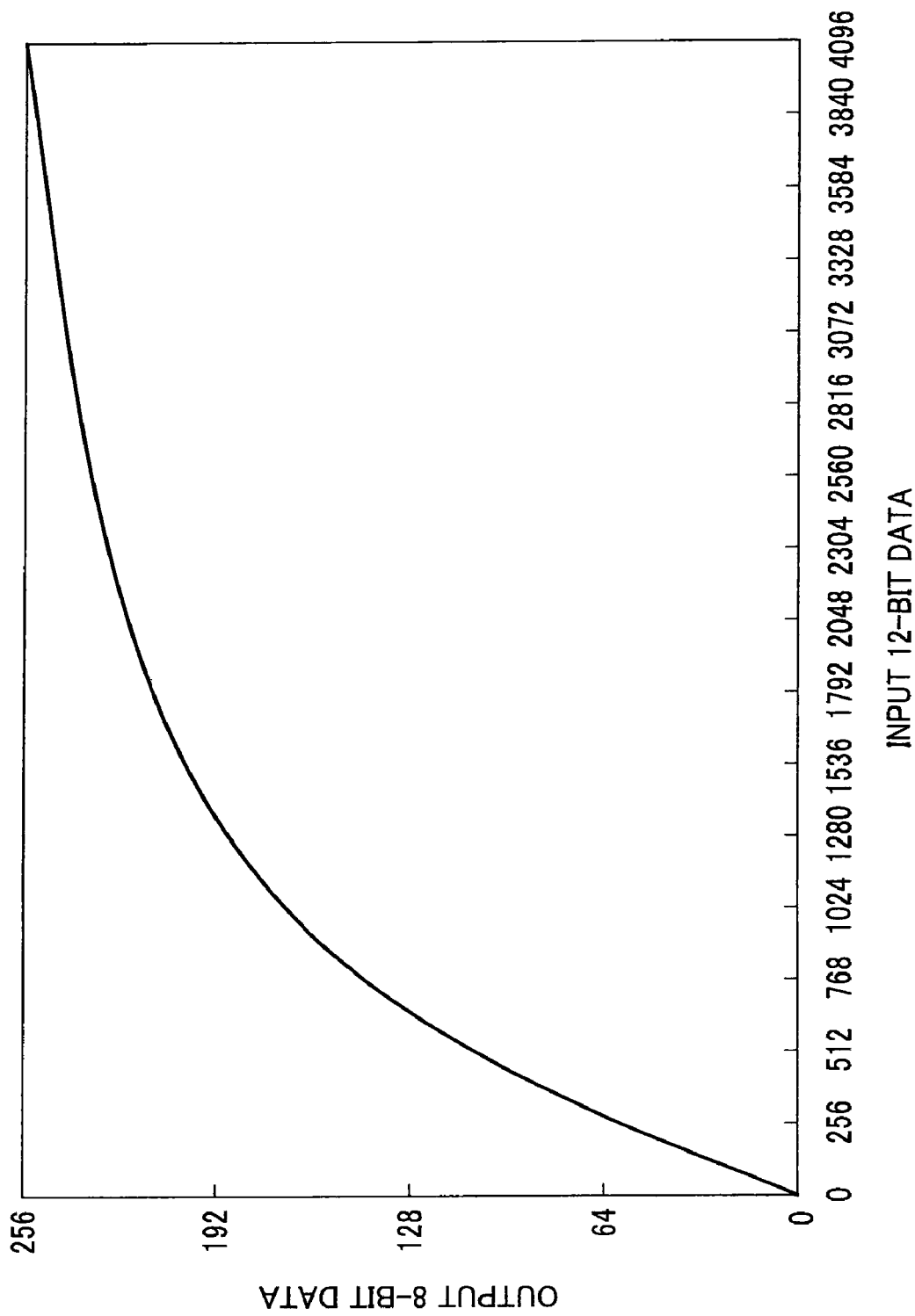
FIG. 12 illustrates an example of a conversion graph which converts (γ-converts) 12-bit RGB data to 8-bit RGB data.

All the data (12-bit) of RGB produced in the RGB data producer 53 is inputted to the tone curve convertor 54. The tone curve convertor 54 performs a γ conversion, which converts 12-bit RGB data to 8-bit RGB data, by a conversion graph as illustrated in FIG. 12, for example, and produces 8-bit RGB data, and then outputs the 8-bit RGB data to the RGB-YUV convertor 55. The RGB-YUV convertor 55 converts the RGB data (8-bit) inputted to YUV data by a matrix calculation (step S14), and outputs the YUV data to the image size convertor 56. The image size convertor 56 performs a reduction or an expansion to a desired image size on the YUV data (8-bit) inputted, and outputs the YUV data on which the reduction or the expansion to the desired image size is performed to the edge enhancer 57. The edge enhancer 57 performs an appropriate edge enhancement operation and the like on the YUV data (8-bit) inputted and then stores the YUV data in the SDRAM 23 via the memory controller 35.

The YUV data is read out from the SDRAM 23, and is converted a size corresponding to the number of recording pixels in the resize processor 38, and is compressed to image data in JPEG format and so on in the data compressing section 40 (step S15). After this compressed image data in JPEG format and so on is restored in the SDRAM 23, this compressed image data is read out from the SDRAM 23 via the memory controller 35, and then is recorded in the memory card 14 via the media I/F 41 (step S16).

Thus, in the digital camera 1 of the present embodiment, even when shooting such that the pixel output of the G filter which has high sensitivity in the processing unit exceeds the saturation level, based on the pixel outputs of the R and B filters which do not reach the saturation level and have low sensitivity, the pixel output of the G filter saturated is compensated, and thereby, as illustrated in FIG. 4, based on an extended area (dashed-line parts of the pixel output of the G filter illustrated as "d", "e" of FIG. 4) where the pixel output of the G filter ("d", "e" of FIG. 4) is compensated, it is possible to expand twice the dynamic range at one shooting. Therefore, even in a case where there is a high brightness part in a background and the like of a photographic subject, it is possible to prevent an occurrence of whiteout and obtain a favorable tone property In addition, in the digital camera 1 of the present embodiment, by use of the brightness histogram produced from RAW-RGB data of the image of the photographic subject as described above, the ratio of the number of pixels of the maximum brightness area is judged to be equal to or more than, for example, 3% of the number of the entire pixels or not, and based on the judgment result, an appropriate conversion graph (see FIGS. 10A and 10B) used in the case of performing the bit compression to convert the compensated pixel output data of the G filter (14-bit data) outputted from the D range expansion compensator 50 to 12-bit data by the bit compression convertor 51 is selected.

Therefore, for example, in the case of an image of a photographic subject such that a histogram illustrated in FIG. 11A is produced when shooting scenery in cloudy weather and the ratio of the number of pixels of the maximum brightness area is less than 3% of the number of the entire pixels, the conversion graph illustrated in FIG. 10B is selected, and thereby like the histogram illustrated in FIG. 11C, the bit allocation in the high brightness side is reduced and appropriate tone and contrast can be obtained.

Embodiment 2

Under an achromatic-color light source (for example, a light source having a wide wavelength band such as sunlight), as Embodiment 1, only the pixel output of the G filter which has highest sensitivity reaches the saturation level earlier; however, for example, under a reddish light source compared to under the achromatic-color light source, there may be a case where both the pixel output of the G filter and the pixel output of the R filter reach the saturation level (in this case, the pixel output of the B filter does not reach the saturation level.)

As described above, in a case where both the pixel output of the G filter and the pixel output of the R filter reach the saturation level, the compensated value of the pixel output of the G filter calculated from the formulas (1) to (5) is inaccurate, and there may be a possibility of a change in hue because of performing the bit compression with the compression rate used for the pixel output of the G filter without compensating the value of the pixel output of the R filter.

Therefore, in a case where the value of the pixel output of the G filter and the value of pixel output of the R filter reach the saturation level, preferably, the dynamic range expansion operation by the above-described compensation is not performed. Or, in a case where a plurality of (the pixel output of the G filter and the pixel output of the R filter (or the pixel output of the B filter)) the pixel output values are the saturation level, it is assumed that brightness in the processing unit is extremely bright, the pixel output value of the G filter may be set to a predetermined value, for example, the pixel output of the G filter=4096×1.8=7372 (14-bit).

In the present embodiment, the case of under the reddish light source compared to under the achromatic-color light source has been described as above; however, a case of under a bluish light source compared to under the achromatic-color light source is the same. Incidentally, in this case, both the pixel output of the G filter and the pixel output of the B filter reach the saturation level.

Embodiment 3

In Embodiment 1, in a case where the pixel output of the G filter reaches the saturation level, for example, in the histogram of the brightness distribution as illustrated in FIG. 11A produced when scenery in cloudy weather is shot, when the ratio of the number of pixels of the maximum brightness area (area "a" of FIG. 11A) is, for example, less than 3% of the number of the entire pixels, the dynamic range expansion operation by the compensation is performed, and the bit conversion graph illustrated in FIG. 10B is selected, and the bit compression by use of the conversion graph illustrated in FIG. 10B is performed. However, in a case where the ratio of the number of pixels of the maximum brightness area is as small as, for example, less than 3% of the number of the entire pixels, the dynamic range expansion operation by the compensation as described in Embodiment 1 and the bit compression by use of the conversion graph illustrated in FIG. 10B may not be preformed.

That is, in the case where the ratio of the number of pixels of the maximum brightness area is as small as less than 3% of the number of the entire pixels, for example, the number of pixels of the maximum brightness area is originally low. Thus, because the number of pixels of the G filter which reach the saturation level is low, a ratio of a part where whiteout occurs in an image of a photographic subject is small, and a proper tone can be obtained as a whole.

Embodiment 4

In Embodiment 1, the still image shooting operation in the dynamic range expansion mode was explained, and in the present embodiment, even in the case of a monitoring operation before the still image shooting operation in this dynamic range expansion mode, the dynamic range expansion operation described in Embodiment 1 is performed. A digital camera of the present embodiment has the same configuration as the digital camera 1 described in Embodiment 1.

Figure 13:
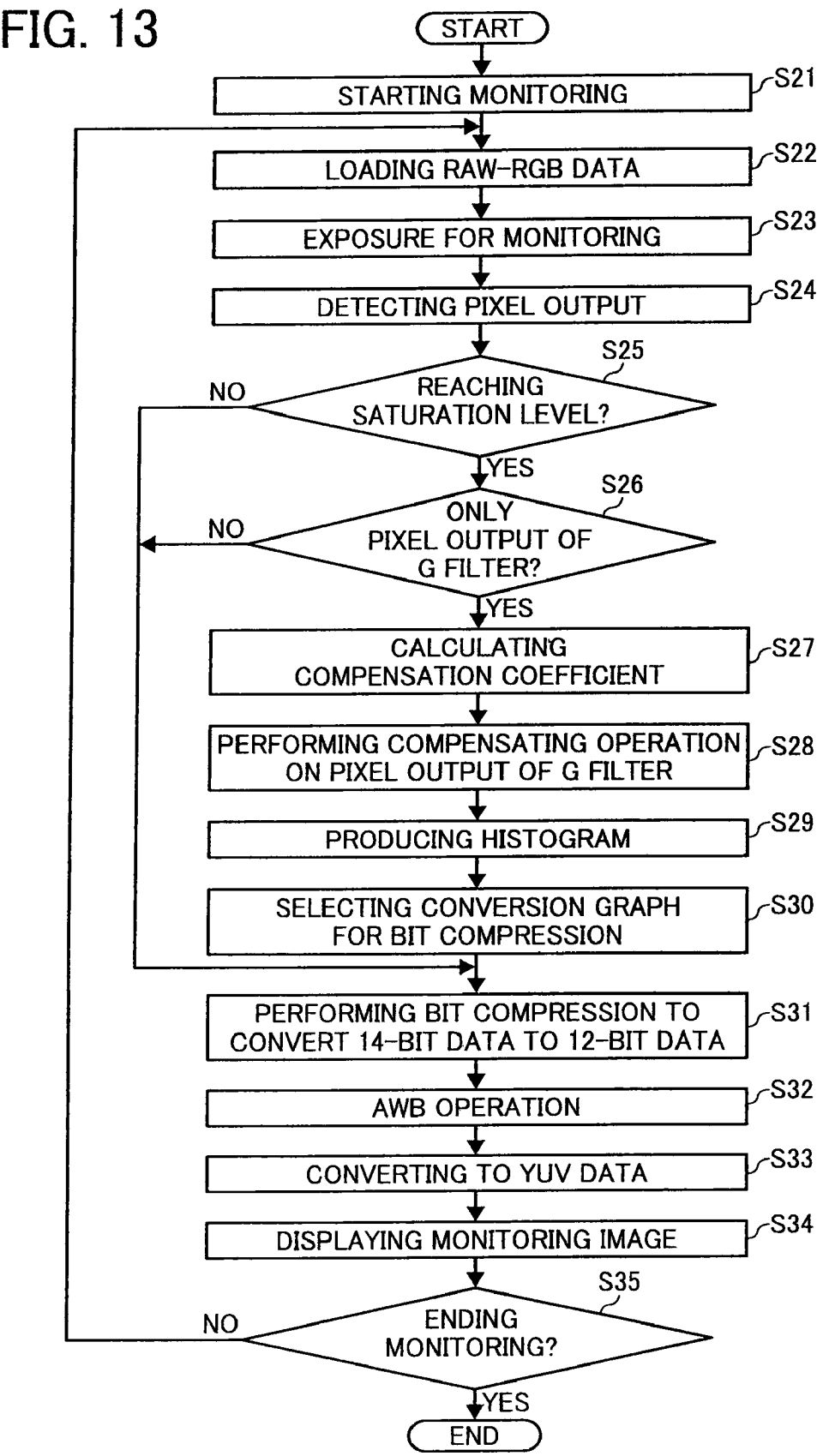
FIG. 13 is a flow chart illustrating a dynamic range expansion operation when performing a monitoring operation in Embodiment 4 of the present invention.

Hereinafter, the dynamic range expansion operation when performing the monitoring operation in the present embodiment will be explained with reference to the flow chart illustrated in FIG. 13.

A user turns the power switch 3 on, and sets the shooting/playback switch dial 4 to a shooting mode, and thereby the digital camera 1 is started up in a recording mode and a monitoring operation is started (step S21). And the camera I/F 34 of the signal processing section 22 loads RAW-RGB data via the photographing lens system 5, the CCD 20, and the AFE section 21 (step S22).

The camera I/F 34 calculates an AE (Auto Exposure) evaluation value, an AF (Auto Focus) evaluation value, and an AWB (Auto White Balance) evaluation value from the loaded RAW-RGB data. The controlling section 27 performs an AE operation based on the calculated AE evaluation value, and determines an exposure when monitoring. And then based on the determined exposure condition, an exposure for monitoring is performed (step S23), and thereby an image of a photographic subject when monitoring (hereinafter, it is referred as "monitoring image") is formed on a light receiving surface of each pixel of the CCD 20.

An electric signal (analog RGB image signal) based on the monitoring image outputted from the CCD 20 is outputted to the A/D converting section 33 via the CDS 31 and the AGC 32, and is converted to 12-bit RAW-RGB data by the A/D converting section 33. This RAW-RGB data is loaded to the camera I/F 34 of the signal processing section 22 and is stored in the SDRAM 23 via the memory controller 35.

Then, the RAW-RGB data read out from the SDRAM 23 is inputted to the YUV converting section 37 of the D range expansion compensator 50, and as described above, the pixel output judging processor 60 of the D range expansion compensator 50 detects a pixel output of each pixel provided with the RGB filter (step S24) and judges if the pixel output of each pixel provided with the RGB filter reaches a saturation level which is set beforehand (step S25). In a case where the pixel output judging processor 60 judges that there is at least one pixel output which reaches the saturation level (YES of step S25), the pixel output judging processor 60 judges if the pixel output which reaches the saturation level is only a pixel output of G filter which has highest sensitivity (step S26).

In the step S26, in a case where the pixel output judging processor 60 judges that the pixel output which reaches the saturation level is only the pixel output of the G filter (YES of step S26), the pixel output judging processor 60 calculates a compensation coefficient to compensate the pixel output of the G filter by the formula (1) and the formulas (3) to (5) (step S27). And then, the pixel output compensation processor 61 multiplies the pixel output of the G filter by the compensation coefficient calculated by the step S25 as described by the formula (2), and performs a compensating operation on the pixel output of the G filter (step S28).

A brightness histogram of the monitoring image is produced based on the RAW-RGB data by the histogram producing section 36 (step S29). And the controlling section 27 calculates a ratio of the number of pixels of a maximum brightness area to the number of entire pixels of a brightness distribution from the histogram produced in the step S29 as described later, and based on the calculated ratio, an appropriate conversion graph in the case of performing a bit compression to convert the pixel output data of the G filter extended (converted) to 14-bit data in the D range expansion compensator 50 (pixel output judging processor 60, pixel output compensation processor 61) to 12-bit data in the bit compression convertor 51 is selected by a following judging operation (step S30).

A judging operation in the case of selecting the appropriate conversion graph in the step S30 is the same as in Embodiment 1. In the histogram of the brightness distribution produced in the step S29, as illustrated in FIG. 11A, for example, a vertical axis indicates the number of pixels and a horizontal axis indicates a range of a brightness value (0-255), and here the horizontal axis is divided into 32 areas, for example. In the step S30, the controlling section 27 judges if a ratio of the number of pixels of a maximum brightness area (area "a" of FIG. 11A) of the histogram is, for example, equal to or more than 3% of the number of entire pixels of the histogram. In a case where the controlling section 27 judges that the ratio of the number of pixels of the maximum brightness area is equal to or more than 3% of the number of the entire pixels, the conversion graph illustrated as FIG. 10A is selected. In a case where the controlling section 27 judges that the ratio of the number of pixels of the maximum brightness area is less than 3% of the number of the entire pixels, the conversion graph illustrated in FIG. 10B is selected.

The bit compression convertor 51 reads out the selected conversion graph from the ROM 24 by the control signal from the controlling section 27, and performs the bit compression to convert 14-bit data to 12-bit data, by use of the read-out conversion graph (step S31). The bit compression convertor 51 also performs the bit compression to convert pixel output data of the R and B filters from 14-bit data to 12-bit data based on the conversion graph used in the case of performing the bit compression to convert the pixel output data of the G filter from the 14-bit data to the 12-bit data.

As described above, the bit allocation in a high brightness side by use of the conversion graph illustrated in FIG. 10A can be larger than by use of the conversion graph illustrated in FIG. 10B. Therefore, in the case of a monitoring image such that the ratio of the number of pixels of the maximum brightness area is equal to or more than 3% of the number of the entire pixels, for example, like a brightness histogram produced when shooting scenery with a bright sky in fine weather, the conversion graph illustrated in FIG. 10A is selected, and thereby the bit allocation in the high brightness side is increased, and appropriate tone and contrast in an entire brightness range including the high brightness part can be obtained.

On the other hand, as described above, in the case of a monitoring image such that the ratio of the number of pixels of the maximum brightness area is less than 3% of the number of the entire pixels, the conversion graph illustrated in FIG. 10B is selected, and thereby, for example, like a histogram illustrated in FIG. 11C, the bit allocation in the high brightness side is reduced and appropriate tone and contrast can be obtained.

Then, each pixel output data of the RGB filter converted from the 14-bit data to the 12-bit data by performing the bit compression in the bit compression convertor 51 is inputted to the white balance controller 52, and a white balance (AWB) operation is performed (step S32).

In the step S25, in a case where the pixel output judging processor 60 judges that there is no pixel output which reaches the saturation level (NO of step S25), and in the step S26, in a case where the pixel output judging processor 60 judges that not only the pixel output of the G filter but also at least one of the pixel output of the R and B filters reach the saturation level (NO of step S26), without performing operations of the steps S27-S30, the bit compression to convert each pixel output data of the RGB filter extended (converted) to 14-bit data to 12-bit data is performed in the step S31.

And then, each pixel output data (12-bit) of the RGB filter in which white balance is adjusted by the white balance controller 52 is converted to YUV data (YUV signal) via the RGB data producer 53, the tone curve convertor 54, the RGB-YUV convertor 55, the image size convertor 56, the edge enhancer 57, as described above. After being converted to the YUV data (YUV signal) (step S33), the YUV data is stored in the SDRAM 23 via the memory controller 35.

Then, The YUV data read out from the SDRAM 23 via the memory controller 35 is converted to, for example, image data of VGA (Video Graphic Array) size for monitoring in the display output controlling section 39, and the monitoring image is displayed on the LCD monitor 9 (step S34). In the step S34, when monitoring, that is, when the monitoring image is displayed on the LCD monitor 9, image data of the monitoring image for one frame is read out at $\frac{1}{30}$ second (i.e. 30 fps) by the camera I/F 34.

The above monitoring operation is continued for a time when the power button 3 is on and the shooting mode is being set (No of step S35), and is finished by canceling the setting of the shooting mode or turning off the power button 3 by the user (Yes of step S35).

Figure 14A:
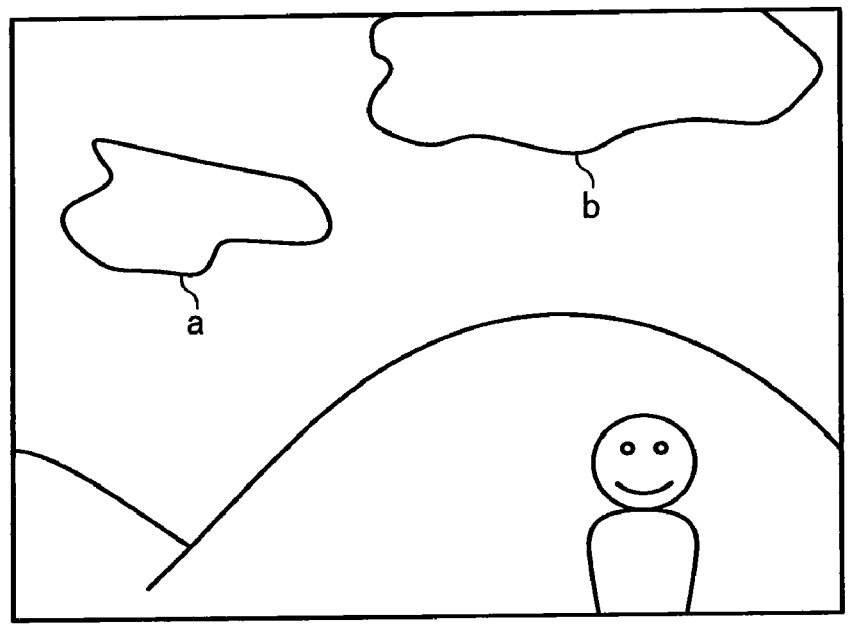
FIG. 14A illustrates an example of a monitoring image before performing the dynamic range expansion operation.
Figure 14B:
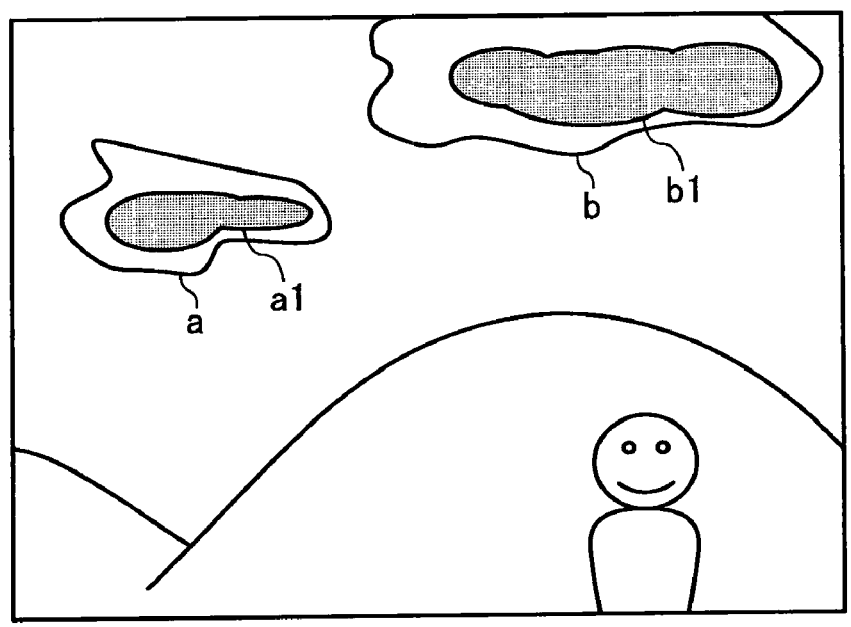
FIG. 14B illustrates an example of a monitoring image after performing the dynamic range expansion operation.

Thus, even in a case where a monitoring image before performing the dynamic range expansion operation is a scenic image in fine weather and there are whiteout portions in clouds (a, b of FIG. 14A) for example, as illustrated in FIG. 14A, (in a case where the pixel output of the G filter is equal to or more than a saturation level), as illustrated in FIG. 14B, the whiteout portions in clouds (a1, b1 of FIG. 14B) are suppressed, and a monitoring image having a favorable tone can be displayed by the dynamic range expansion operation when performing the above monitoring operation.

Therefore, when performing the monitoring operation before shooting the still image in the dynamic range expansion mode described in Embodiment 1, the user can previously check an effect obtained by the above dynamic range expansion operation by the monitoring image displayed on the LCD monitor 9.

Figure 15A:
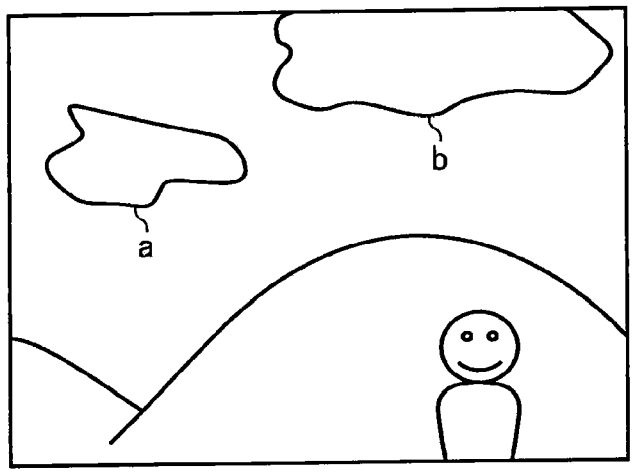
FIG. 15A illustrates an example of a monitoring image which is switched and displayed when a monitoring image display switching mode is set, and is an example of a monitoring image before performing the dynamic range expansion operation.
Figure 15B:
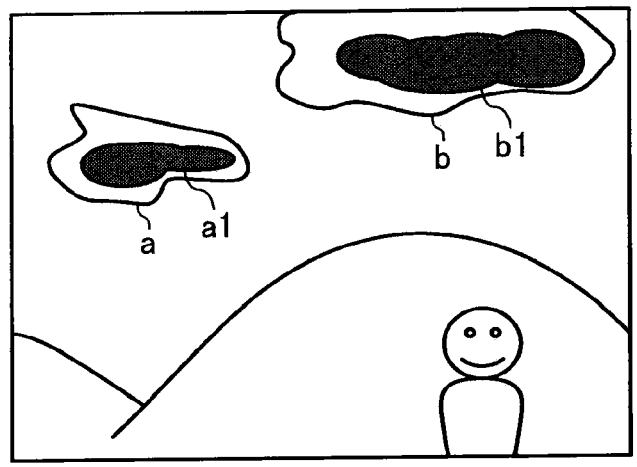
FIG. 15B illustrates an example of a monitoring image which is switched and displayed when a monitoring image display switching mode is set, and is an example of a monitoring image in which a whiteout part is displayed before performing the dynamic range expansion operation.
Figure 15C:
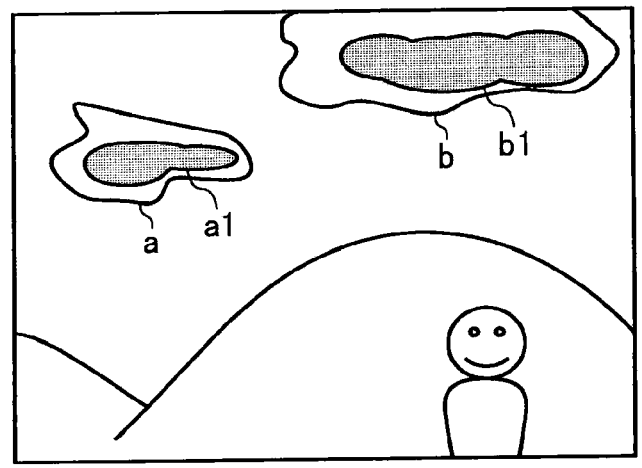
FIG. 15C illustrates an example of a monitoring image which is switched and displayed when a monitoring image display switching mode is set, and is an example of a monitoring image after performing the dynamic range expansion operation.

In addition, the digital camera in the present embodiment has a monitoring image display switching mode, and by operating a display switch button (not illustrated) and setting the display switching mode when monitoring, the digital camera can sequentially switch at predetermined intervals (for example, at intervals of 1 second) and display monitoring images as illustrated in FIGS. 15A, 15B, and 15C by a control of the controlling section 27.

FIG. 15A is a monitoring image before performing the dynamic range expansion operation (a scenic image in fine weather and there are whiteout portions in clouds (a, b of FIG. 15A)). FIG. 15B is a monitoring image indicating the whiteout portions (portions in black: a1, a2 of FIG. 15B) in clouds. FIG. 15C is a monitoring image in which a tone is obtained in the whiteout portions of clouds (a1, a2 of FIG. 15C) by the dynamic range expansion operation when performing the above monitoring operation.

Thus, by setting the monitoring image display switching mode, for example, the monitoring images as illustrated in FIGS. 15A, 15B, and 15C are sequentially switched at the predetermined intervals and displayed on the LCD monitor 9, and thereby the user can easily check whiteout portions in an image and a compensation of a whiteout state by the dynamic range expansion operation by the monitoring image displayed on the LCD monitor 9.

While performing the monitoring operation when performing the above dynamic range expansion operation, for a time until the still image shooting operation starts by a pressing operation of the shutter release button 2 from a half-pressed state to a fully-pressed state by the user, or for a time until the pressing operation is canceled by releasing the shutter release button 2 from the half-pressed state by the user, the monitoring image produced by the dynamic range expansion operation as illustrated in FIG. 15C is maintained and displayed by the monitoring image display switching mode.

Embodiment 5

In Embodiment 1, for example, under a light source having a wide wavelength band such as sunlight (hereinafter, it is referred to as "general light source"), the compensating operation of the pixel output of the G filter in the processing unit reaching the saturation level has been explained; however, in the present embodiment, under a light source of a low color temperature, a high color temperature, or the like, a compensating operation of the pixel output of the G filter in the processing unit reaching the saturation level will be explained.

Figure 16:
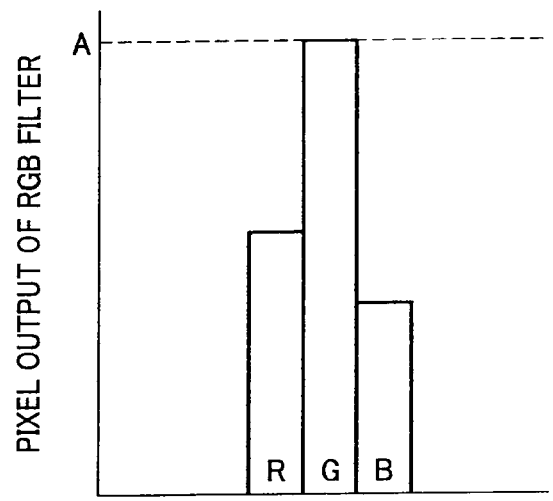
FIG. 16 illustrates a case where a pixel output of a G filter reaches a saturation level A and each pixel output of R and B filters in the vicinity of the G filter reaches approximately ½ of the saturation level A.

As described in Embodiment 1, under the general light source, for example, as illustrated in FIG. 16, in a case where a pixel output of a G filter in a processing unit (see FIG. 7) reaches a saturation level A, each pixel output of E and B filters in the vicinity of the G filter is in a state of approximately ½ of the saturation level A.

Figure 17A:
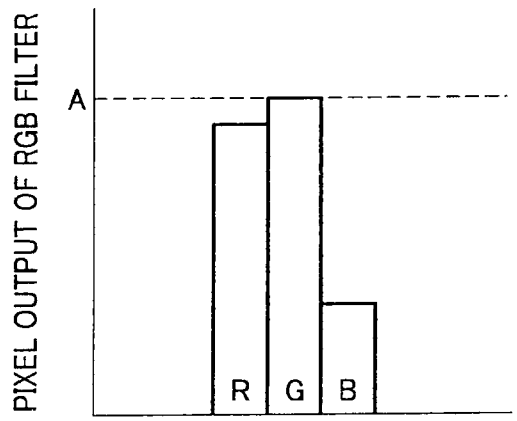
FIG. 17A illustrates a case where the pixel output of a G filter reaches the saturation level A and the pixel output of R filter in the vicinity of the G filter is close to the saturation level A.
Figure 17B:
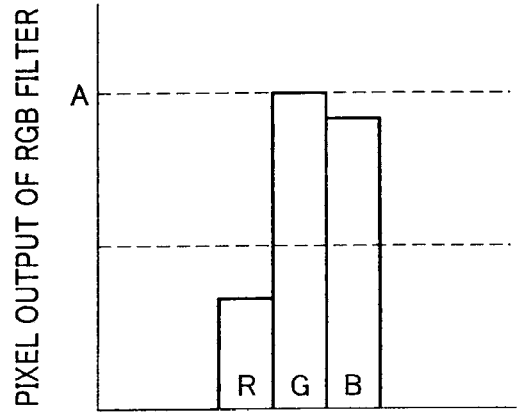
FIG. 17B illustrates a case where the pixel output of a G filter reaches the saturation level A and the pixel output of B filter in the vicinity of the G filter is close to the saturation level A.

On the other hand, under the light source of the low color temperature, for example, as illustrated in FIG. 17A, in a case where the pixel output of the G filter in the processing unit reach the saturation level A, the pixel output of the R filter in the processing unit is close to the saturation level A. And the pixel output of the B filter is less than or equal to ½ of the saturation level A. In addition, under the light source of the high color temperature, for example, as illustrated in FIG. 17B, in a case where the pixel output of the G filter in the processing unit reaches the saturation level A, the pixel output of the B filter is close to the saturation level A. and the pixel output of the R is less than or equal to the saturation level A.

And, for example, as illustrated in FIG. 17A, even in a case where the pixel output of the R filter is the output level closer to the pixel output of the G filter reaching the saturation level A, based on the formulas (1) to (5), a compensating operation such that the pixel output of the G filter is expanded to equal to or more than the saturation level A can be performed. And then the bit compression to convert the pixel output of the G filter extended (converted) to 14-bit data to 12-bit data is performed, and additionally the bit compression to convert each pixel output of the R and B filters extended (converted) to 14-bit data to 12-bit data is also performed by use of the same compression rate as the compression rate of the pixel output of the G filter.

In this case, in a case where the bit compression to convert again the pixel output of the G filter extended (converted) to 14-bit data to 12-bit data is performed, if the conversion graph illustrated in FIG. 10A is used, a maximum value of 8190 of the high brightness side is converted to a value of 4095.

Therefore, when multiplying the pixel output of the R filter where the bit compression to convert again from 14-bit data to 12-bit data is performed by the compensation coefficient to adjust white balance, the pixel output of the R filter does not reach a saturation level which is a value of 4095 (12-bit). Therefore, under this circumstance, even after performing the compensating operation such that the pixel output of the G filter is expanded to equal to or more than the saturation level A, a bright part of an image where whiteout occurs does not become white, and a color shift occurs. As illustrated in FIG. 17B, a case where the pixel output of the B filter is close to the pixel output of the G filter reaching the saturation level A is also the same.

Therefore, in the present embodiment, in a case where the pixel output of the R filter or the pixel output of the B filter is close to the pixel output of the G filter reaching the saturation level A, to prevent the above color shift, the conversion graph illustrated in FIG. 10B is used. In the conversion graph illustrated in FIG. 10B, a value of 6143 of the high brightness side is converted to a value of 4095, and the compression rate of the high brightness side is smaller than that of the conversion graph illustrated in FIG. 10A.

Thus, in a case where the pixel output of the R filter or the pixel output of the B filter is close to the pixel output of the G filter reaching the saturation level A, after performing the compensating operation such that the pixel output of the G filter is expanded to equal to or more than the saturation level A described in Embodiment 1, the conversion graph illustrated in FIG. 10B is used, and the compression rate of the high brightness side used in the case of converting 14-bit data to 12-bit data is small.

Therefore, when multiplying the pixel output of the R filter or the pixel output of the B filter where the bit compression to convert again from 14-bit data to 12-bit data is performed by the compensation coefficient to adjust white balance, even if the compensation coefficient is small, the pixel output of the R filter or the pixel output of the B filter can reach the saturation level which is the value of 4095, and thereby even after performing the compensating operation such that the pixel output of the G filter is expanded to equal to or more than the saturation level A, an occurrence of the color shift can be prevented in the bright part of the image where whiteout occurs.

Embodiment 6

In Embodiment 1, as illustrated in FIG. 6, for the CCD 20 having the RGB filter, 2×2 pixels are taken as the processing unit (minimum unit). However, in the present embodiment, as illustrated in FIG. 18, a processing unit (minimum unit) includes 5 pixels in a bold-line frame A (1 pixel of the G filter, 2 pixels of the R filter (R1 and R2) and 2 pixels of the B filter (B1 and B2)), and the processing unit of the present embodiment has a wider range than the processing unit of Embodiment 1. In the present embodiment, a configuration of a digital camera, a monitoring operation, a still image shooting operation, and a dynamic range expansion operation are the same as in Embodiment 1.

In the present embodiment, the pixel output judging processor 60 calculates an average value of the pixel output of 2 of R1 and R2 filters and an average value of the pixel output of 2 of B1 and B2 filters in the vicinity of 1 of the pixel of the G filter in the processing unit (see FIG. 18), and each calculated average value is taken as each pixel output value of the R and B filters in the processing unit (see FIG. 18).

In a case where the pixel output of the G filter in the processing unit of the bold-line frame A as illustrated in FIG. 18 reaches the saturation level, a sensitivity of the G filter is approximately twice as high as the sensitivities of the R and B filters as described above, and a compensation coefficient (K) of the pixel output of the G filter and a pixel output of the G filter after compensation (Ge) are calculated by the formulas (6) and (7) below.

$$K=\{l \times f(Ro)+m \times f(Go)+n \times f(Bo)\}/3 \quad \text{formula (6)}$$

$$Ge=K \times Go \quad \text{formula (7)}$$

l, m, and n are coefficients which are set based on sensitivity rates of each filter of the RGB filter, and Go is a pixel output of the G filter before compensation. And f(Ro), f(Go), f(Bo) are coefficients which are set by Number 2 (formulas (8) to (10)) below.
[Number 2]

If $Ro \leq TR$:$f(Ro)=1$

If $Ro > TR$:$f(Ro)=Ro/TR$ formulas (8)

If $Go < TG$:$f(Go)=1$

If $Go = TG$:$f(Go)=Go/TG$ formulas (9)

If $Bo \leq TB$:$f(Bo)=1$

If $Bo > TB$:$f(Bo)=Bo/TB$ formulas (10)

Ro is an average value of the pixel output of the R filter in the processing unit (see FIG. 18), TR is a saturation judging level of the pixel output of the R filter, Go is a pixel output of the G filter in the processing unit (see FIG. 18), TG is a saturation judging level of the pixel output of the G filter, Bo is an average value of the pixel output of the B filter in the processing unit (see FIG. 18), and TB is a saturation judging level of the pixel output of the B filter.

TR, TG, and TB in the formulas (8) to (10) are the same as those in the formulas (3) to (5). And as for coefficients l, m and n in the formula (6), if sensitivity rates of each pixel output of the RGB filter are the same as those in Embodiment 1, the coefficients l and n are ³⁄₂ respectively, and the coefficient m is 0.

The pixel output compensation processor 61 of the D range expansion compensator 50 illustrated in FIG. 5 replaces a pixel output value of the G filter calculated by the formula (7) as a pixel output value of the G filter in the processing unit described above (see FIG. 18). Hereinafter, the same operations as in Embodiment 1 are performed.

Thus, by widening the processing unit, a sensitivity difference influence that pixels of the R1 and R2 filters and pixels of the B1 and B2 filters in the processing unit have is moderated. Therefore, it is possible to more accurately perform the dynamic range expansion compensating operation on the pixel output of the G filter.

In each of the above embodiments, a configuration where three primary color filters of RGB (Red, Green and Blue) as color separation filters are placed is used. However, even in a configuration where complementary color filters as the color separation filters are placed, the present invention is applicable as well.

According to an embodiment of the present invention, without performing a plurality of shootings with different exposure amounts and producing a composite image, the dynamic range can be expanded at one shooting. Additionally, appropriate tone and contrast in an entire brightness range including the high brightness part can be obtained.

According to an embodiment of the present invention, appropriate tone and contrast in an entire brightness range including the high brightness part can be obtained.

According to an embodiment of the present invention, a tone property in less than or equal to a predetermined output level in the vicinity of the saturation level can be maintained.

According to an embodiment of the present invention, a tone property in less than or equal to the predetermined brightness can be maintained.

According to an embodiment of the present invention, an occurrence of color shift can be prevented in a part of an image in which whiteout occurs.

According to an embodiment of the present invention, a user can easily check a dynamic range expansion effect when monitoring.

According to an embodiment of the present invention, the compensating operation can be performed by a judgment of the user.

According to embodiments of the present invention, a memory used for judging each pixel output can be reduced, and additionally a higher-speed judging operation of the pixel output can be achieved.

According to an embodiment of the present invention, a highly-accurate compensation of a saturated pixel can always be performed.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
    an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of each of the pixels and images an image of the photographic subject;
    a pixel output judging processor which judges if the pixel output of each of the pixels converted to data reaches a saturation level or not;
    a pixel output compensation processor, in a case where a pixel output of a pixel on which a specific color filter is placed is judged to reach the saturation level by the pixel output judging processor, based on a pixel output of a pixel on which a color filter other than the specific color filter is placed in the vicinity of the pixel on which the specific color filter is placed, which performs a compensating operation to compensate the pixel output of the pixel on which the specific color filter is placed which reaches the saturation level;
    a bit compression convertor which performs a bit compression such that pixel output data from the pixel output compensation processor, which is once converted from a first bit number to a second bit number larger than the first bit number, is converted again to the first bit number;
    a histogram producer which produces a brightness histogram of the image of the photographic subject based on the pixel output of each of the pixels; and
    a calculator which calculates a ratio of the number of pixels of a maximum brightness area of areas where a brightness distribution is plurally divided to the number of entire pixels from the brightness histogram produced by the histogram producer,
    wherein the bit compression convertor performs the bit compression based on a bit compression characteristic set on the basis of the ratio of the number of pixels of the maximum brightness area calculated by the calculator, and in a case where the pixel output of the pixel on which the specific color filter is placed reaches the saturation level and the pixel output of the pixel on which the color filter other than the specific color filter is placed in the vicinity of the pixel on which the specific color filter is placed is close to the saturation level, the bit compression convertor performs the bit compression with a smaller compression rate for the bit compression on data based on a pixel output which is equal to or more than the saturation level, compared to a case where the pixel output of the pixel on which the specific color filter is placed reaches the saturation level and the pixel output of the pixel on which the color filter other than the specific color filter is placed in the vicinity of the pixel on which the specific color filter is placed is approximately ½ of the saturation level.

2. The imaging apparatus according to claim 1, wherein in a case where the ratio of the number of pixels of the maximum brightness area to the number of the entire pixels calculated by the calculator is smaller than a predetermined threshold value, the bit compression convertor performs the bit compression based on a compression characteristic in which a compression rate for the bit compression of pixel output data of a high brightness side including the maximum brightness area is small, compared to a case where the ratio of the number of pixels of the maximum brightness area to the number of the entire pixels calculated by the calculator is larger than the predetermined threshold value.

3. The imaging apparatus according to claim 1, wherein the bit compression convertor performs the bit compression with a smaller compression rate for the bit compression on data based on a pixel output which is less than or equal to a predetermined output level than on data based on a pixel output which is equal to or more than the predetermined output level in the vicinity of the saturation level.

4. The imaging apparatus according to claim 1, wherein the bit compression convertor uses a compression rate for the bit compression to become an approximately same value before and after performing the bit compression on data based on a pixel output which is less than or equal to the saturation level and in a predetermined brightness.

5. The imaging apparatus according to claim 1, further comprising: an operation selector which selects and performs the compensating operation performed on the pixel output of the pixel where the specific color filter is placed by the pixel output compensation processor.

6. The imaging apparatus according to claim 1, wherein a processing unit for the apparatus is a size of 2×2 pixels in the horizontal and vertical directions.

7. The imaging apparatus according to claim 6, wherein in a case where there is a defective pixel in the processing unit, a pixel on which the same color filter as the defective pixel is placed in the vicinity of the defective pixel is used instead of the defective pixel.

8. An imaging method of an imaging apparatus including an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of each of the pixels and images an image of the photographic subject, comprising:
    a pixel output judging processing step which judges if the pixel output of each of the pixels converted to data reaches a saturation level or not;
    a pixel output compensation processing step, in a case where a pixel output of a pixel on which a specific color filter is placed is judged to reach the saturation level by the pixel output judging processing step, based on a pixel output of a pixel on which a color filter other than the specific color filter is placed in the vicinity of the pixel on which the specific color filter is placed, which performs a compensating operation to compensate the pixel output of the pixel on which the specific color filter is placed which reaches the saturation level;
    a bit compression converting step which performs a bit compression such that pixel output data from the pixel output compensation processing step, which is once converted from a first bit number to a second bit number larger than the first bit number, is converted again to the first bit number;

a histogram producing step which produces a brightness histogram of the image of the photographic subject based on the pixel output of each of the pixels; and a calculating step which calculates a ratio of the number of pixels of a maximum brightness area of areas where a brightness distribution is plurally divided to the number of entire pixels from the brightness histogram produced by the histogram producing step, wherein the bit compression converting step performs the bit compression based on a bit compression characteristic set on the basis of the ratio of the number of pixels of the maximum brightness area calculated by the calculating step, and in a case where the pixel output of the pixel on which the specific color filter is placed reaches the saturation level and the pixel output of the pixel on which the color filter other than the specific color filter is placed in the vicinity of the pixel on which the specific color filter is placed is close to the saturation level, the bit compression converting step performs the bit compression with a smaller compression rate for the bit compression on data based on a pixel output which is equal to or more than the saturation level, compared to a case where the pixel output of the pixel on which the specific color filter is placed reaches the saturation level and the pixel output of the pixel on which the color filter other than the specific color filter is placed in the vicinity of the pixel on which the specific color filter is placed is approximately ½ of the saturation level.

9. The imaging method according to claim 8, wherein in a case where the ratio of the number of pixels of the maximum brightness area to the number of the entire pixels calculated by the calculating step is smaller than a predetermined threshold value, the bit compression converting step performs the bit compression based on a compression characteristic in which a compression rate for the bit compression of pixel output data of a high brightness side including the maximum brightness area is small, compared to a case where the ratio of the number of pixels of the maximum brightness area to the number of the entire pixels calculated by the calculating step is larger than the predetermined threshold value.

10. The imaging method according to claim 8, wherein the bit compression converting step performs the bit compression with a smaller compression rate for the bit compression on data based on a pixel output which is less than or equal to a predetermined output level than on data based on a pixel output which is equal to or more than the predetermined output level in the vicinity of the saturation level.

11. The imaging method according to claim 8, wherein the bit compression converting step uses a compression rate for the bit compression to become an approximately same value before and after performing the bit compression on data based on a pixel output which is less than or equal to the saturation level and in a predetermined brightness.

12. The imaging method according to claim 8, further comprising: a display step which is capable of displaying image data produced based on the pixel output of each of the pixels as a monitoring image when monitoring before recording a shooting image, wherein in a case where the pixel output of the pixel where the specific color filter is placed reaches the saturation level when monitoring, an image in which the compensating operation of the pixel output of the pixel where the specific color filter is placed performed by the pixel output compensation processing step and the bit compression performed by the bit compression converting step are not performed and there is no tone in the maximum brightness area and whiteout occurs, an image in which a portion where the whiteout occurs is indicated, and an image in which the compensating operation of the pixel output of the pixel where the specific color filter is placed performed by the pixel output compensation processing step and the bit compression performed by the bit compression converting step are performed and there is a tone in the maximum brightness area are switched at predetermined time intervals and displayed as monitoring images in the display step.

13. The imaging method according to claim 8, wherein a processing unit for the imaging method is a size of 2×2 pixels in the horizontal and vertical directions.

14. The imaging method according to claim 13, wherein in a case where there is a defective pixel in the processing unit, a pixel on which the same color filter as the defective pixel is placed in the vicinity of the defective pixel is used instead of the defective pixel.

15. An imaging apparatus, comprising:

an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of each of the pixels and images an image of the photographic subject;

a pixel output judging processor which judges if the pixel output of each of the pixels converted to data reaches a saturation level or not;

a pixel output compensation processor, in a case where a pixel output of a pixel on which a specific color filter is placed is judged to reach the saturation level by the pixel output judging processor, based on a pixel output of a pixel on which a color filter other than the specific color filter is placed in the vicinity of the pixel on which the specific color filter is placed, which performs a compensating operation to compensate the pixel output of the pixel on which the specific color filter is placed which reaches the saturation level;

a bit compression convertor which performs a bit compression such that pixel output data from the pixel output compensation processor, which is once converted from a first bit number to a second bit number larger than the first bit number, is converted again to the first bit number;

a histogram producer which produces a brightness histogram of the image of the photographic subject based on the pixel output of each of the pixels;

a calculator which calculates a ratio of the number of pixels of a maximum brightness area of areas where a brightness distribution is plurally divided to the number of entire pixels from the brightness histogram produced by the histogram producer; and a display device which is capable of displaying image data produced based on the pixel output of each of the pixels as a monitoring image when monitoring before recording a shooting image, wherein the bit compression convertor performs the bit compression based on a bit compression characteristic set on the basis of the ratio of the number of pixels of the maximum brightness area calculated by the calculator, and in a case where the pixel output of the pixel where the specific color filter is placed reaches the saturation level when monitoring, an image in which the compensating operation of the pixel output of the pixel where the specific color filter is placed performed by the pixel output compensation processor and the bit compression performed by the bit compression convertor are not performed and there is no tone in the maximum brightness area and whiteout occurs, an image in which a portion where the whiteout occurs is indicated, and an image in which the compensating operation of the pixel output of the pixel where the specific color filter is placed performed by the pixel output compensation processor and the bit compression performed by the bit compression convertor are performed and there is a tone in the maximum brightness area are switched at predetermined time intervals and displayed as monitoring images on the display device.

16. The imaging apparatus according to claim 15, wherein in a case where the ratio of the number of pixels of the maximum brightness area to the number of the entire pixels calculated by the calculator is smaller than a predetermined threshold value, the bit compression convertor performs the bit compression based on a compression characteristic in which a compression rate for the bit compression of pixel output data of a high brightness side including the maximum brightness area is small, compared to a case where the ratio of the number of pixels of the maximum brightness area to the number of the entire pixels calculated by the calculator is larger than the predetermined threshold value.

17. The imaging apparatus according to claim 15, wherein the bit compression convertor performs the bit compression with a smaller compression rate for the bit compression on data based on a pixel output which is less than or equal to a predetermined output level than on data based on a pixel output which is equal to or more than the predetermined output level in the vicinity of the saturation level.

18. The imaging apparatus according to claim 15, wherein the bit compression convertor uses a compression rate for the bit compression to become an approximately same value before and after performing the bit compression on data based on a pixel output which is less than or equal to the saturation level and in a predetermined brightness.

19. The imaging apparatus according to claim 15, wherein a processing unit for the imaging apparatus is a size of 2×2 pixels in the horizontal and vertical directions.

20. The imaging apparatus according to claim 19, wherein in a case where there is a defective pixel in the processing unit, a pixel on which the same color filter as the defective pixel is placed in the vicinity of the defective pixel is used instead of the defective pixel.

* * * * *